(12) United States Patent
Wu et al.

(10) Patent No.: US 11,825,172 B2
(45) Date of Patent: Nov. 21, 2023

(54) DISPLAY APPARATUS

(71) Applicant: Hisense Visual Technology Co., Ltd., Qingdao (CN)

(72) Inventors: Chao Wu, Qingdao (CN); Xuelei Wang, Qingdao (CN); Kejing Lu, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/474,128

(22) Filed: Sep. 14, 2021

(65) Prior Publication Data

US 2021/0409832 A1 Dec. 30, 2021

Related U.S. Application Data

(63) Continuation of application No. PCT/CN2020/083146, filed on Apr. 3, 2020.

(30) Foreign Application Priority Data

Nov. 4, 2019 (CN) .......................... 201911067977.4

(51) Int. Cl.
| | |
|---|---|
| H04N 21/488 | (2011.01) |
| G06F 3/14 | (2006.01) |
| G06F 3/16 | (2006.01) |
| G08C 17/02 | (2006.01) |
| H04N 5/445 | (2011.01) |
| H04N 7/18 | (2006.01) |
| H04N 21/4363 | (2011.01) |

(52) U.S. Cl.
CPC ....... *H04N 21/4882* (2013.01); *G06F 3/1423* (2013.01); *G06F 3/167* (2013.01); *G08C 17/02* (2013.01); *H04N 5/445* (2013.01); *H04N 7/186* (2013.01); *H04N 21/43637* (2013.01); *G08C 2201/31* (2013.01)

(58) Field of Classification Search
None
See application file for complete search history.

(56) References Cited

U.S. PATENT DOCUMENTS

| | | | | |
|---|---|---|---|---|
| 9,071,625 | B2 * | 6/2015 | Reeves | ................... G09G 5/14 |
| 9,268,518 | B2 * | 2/2016 | Reeves | ............. H04N 21/4126 |
| 11,609,364 | B2 * | 3/2023 | Matsubara | ............... G02B 5/04 |
| 2010/0085382 | A1 * | 4/2010 | Lundqvist | ............. G06F 3/1438 |
| | | | | 345/659 |
| 2013/0113993 | A1 | 5/2013 | Dagit, III | |
| 2016/0330413 | A1 * | 11/2016 | Scalisi | ................... H04N 7/186 |
| 2018/0012462 | A1 * | 1/2018 | Heitz, III | ............... G06V 40/20 |
| 2020/0341726 | A1 * | 10/2020 | Park | ........................ G06F 9/451 |

FOREIGN PATENT DOCUMENTS

| | | |
|---|---|---|
| CN | 203178949 U | 9/2013 |
| CN | 103686327 A | 3/2014 |
| CN | 104244106 A | 12/2014 |
| CN | 109922289 A | 6/2019 |

* cited by examiner

*Primary Examiner* — James R Marandi
(74) *Attorney, Agent, or Firm* — Workman Nydegger

(57) ABSTRACT

A display apparatus and an information alert method are disclosed. The method includes: while a first display is playing, controlling, according to acquired alert information, a second display to display an information alert interface, where the alert information displayed on the information alert interface is configured for indicating a state of at least one terminal device connected with the display apparatus.

18 Claims, 20 Drawing Sheets

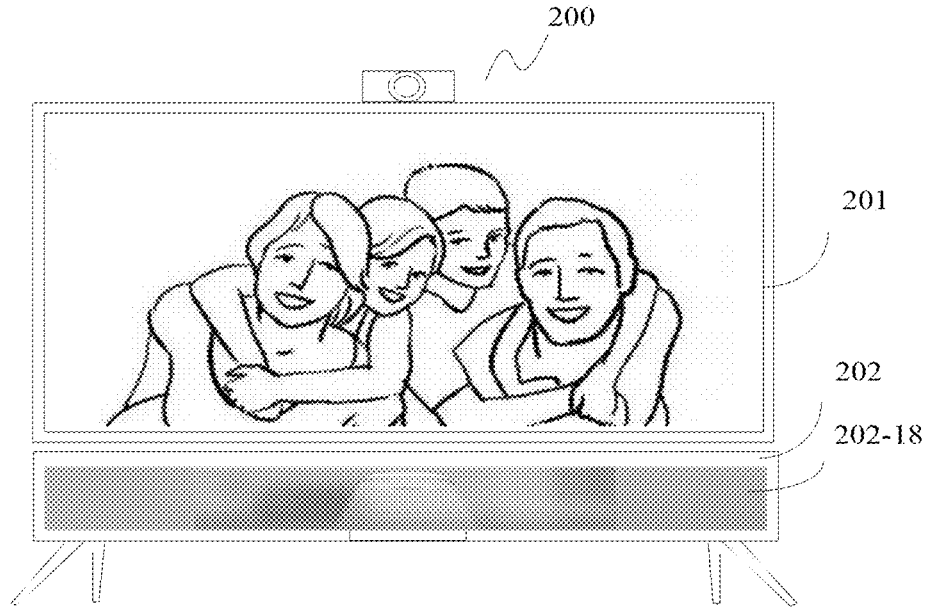
Fig. 19
| While a first display is playing, controlling, according to acquired alert information, a second display to display an information alert interface | — S101 |
Fig. 20
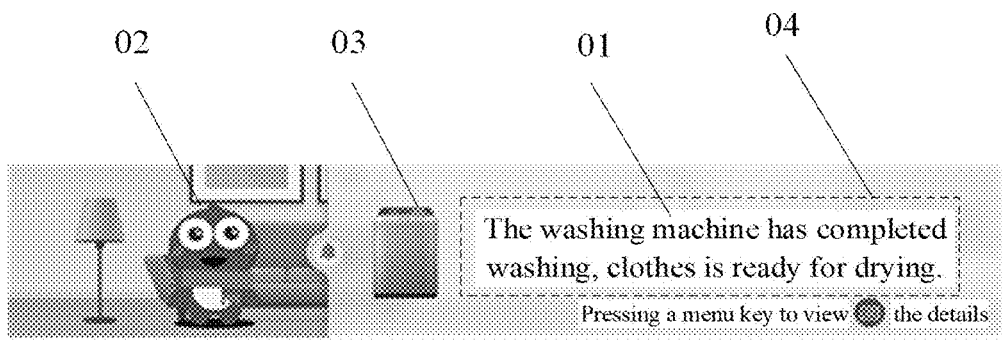
Fig. 21A

DISPLAY APPARATUS

CROSS-REFERENCE TO RELATED APPLICATIONS

This application is a continuation of International Application No. PCT/CN2020/083146 filed Apr. 3, 2020, which claims the benefit and priority of Chinese Patent Application No. 201911067977.4 filed on Nov. 4, 2019. The entire disclosures of the above applications are incorporated herein by reference.

FIELD

The present disclosure relates to intelligent televisions, in particular to a display apparatus and a method for information alert.

BACKGROUND

This section provides background information related to the present disclosure which is not necessarily prior art.

With continuous development of intelligent televisions, a display apparatus provides playing and displaying of audios, videos, images and the like for users. Meanwhile, the display apparatus is connected with various different terminal devices by adopting Internet of Things technique to control the other terminal devices through the television.

In a display process of the above display apparatus, when content is usually displayed to users through the display apparatus in the related art, alert messages related to states of other devices are generated and pushed displaying above the current play content, which will blocks the play content, influences user's watching experience, and severely affects user experience especially if there are too many alerts.

SUMMARY

This section provides a general summary of the disclosure, and is not a comprehensive disclosure of its full scope or all of its features.

An embodiment of the present disclosure provides a display apparatus and an information alert method, which are configured to push alert information associated with an external terminal device to a user through a second display while a user watches content on a first display.

In some embodiments of the present disclosure, a display apparatus is provided. The display apparatus includes a first display and a second display; and a controller configured to: while the first display is playing, according to acquired alert information, control the second display to display an information alert interface, where the alert information displayed on the information alert interface is configured for indicating a state of at least one terminal device connected with the display apparatus.

In some embodiments of the present disclosure, an information alert method is provided. The method includes: while a first display is playing, controlling, according to acquired alert information, a second display to display an information alert interface, where the alert information displayed on the information alert interface is configured for indicating a state of at least one terminal device connected with a display apparatus.

In some embodiments, after controlling the second display to display the information alert interface, the method further includes: in response to a first operation for an alert information control in the information alert interface, controlling the first display to display a details interface of the alert information in a floating window mode, and controlling the second display to return to an interface before displaying the alert information, where the first operation is a selection operation for the alert information control received through a selector.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 19 illustrates a schematic diagram of a user interface in a display apparatus 200 according to an exemplary embodiment.

FIG. 20 illustrates a schematic diagram of an information alert interface according to an exemplary embodiment.

FIG. 21A illustrates a schematic diagram of an information alert interface according to an exemplary embodiment.

Corresponding reference numerals indicate corresponding parts or features throughout the several views of the drawings.

DETAILED DESCRIPTION

Figure 1:
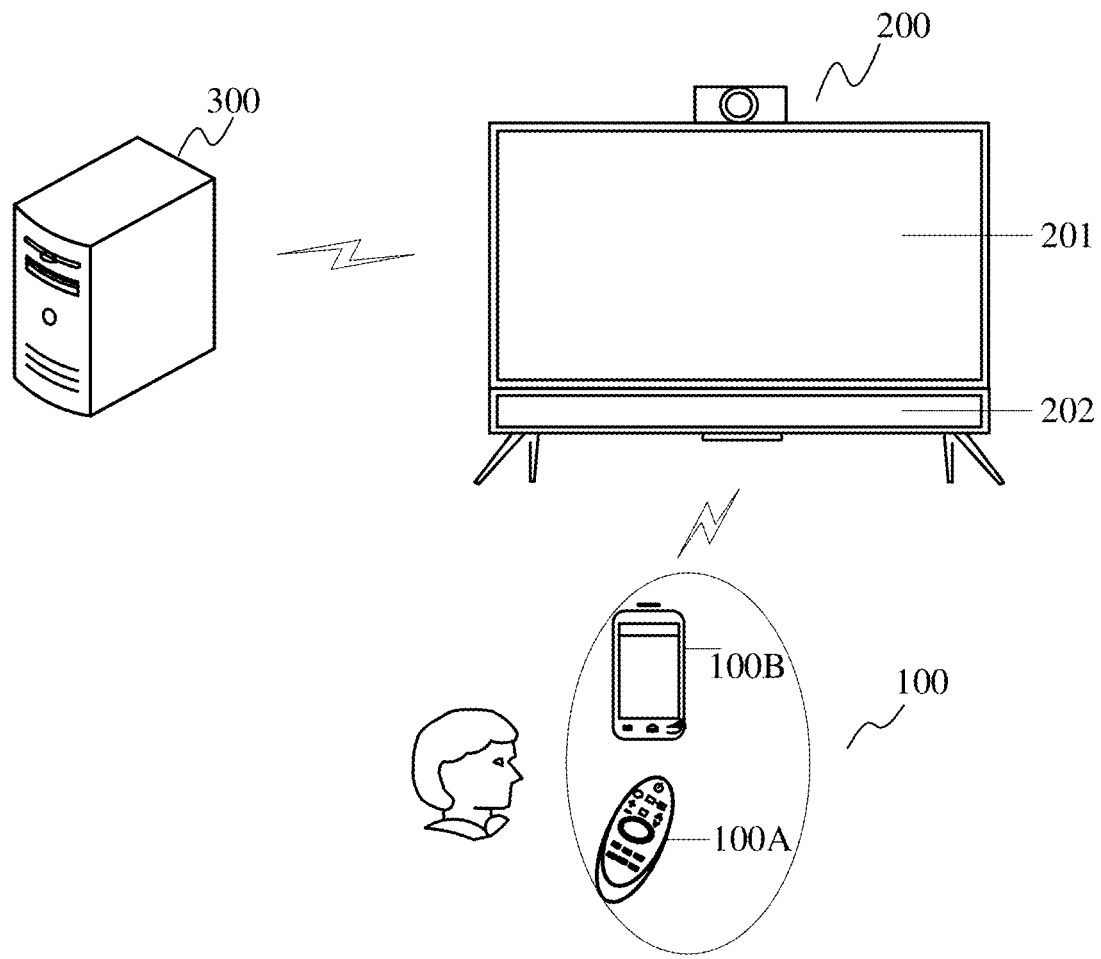
FIG. 1 illustrates a schematic diagram of an operation scenario between a display apparatus and a control device according to an embodiment.

Example embodiments will now be described more fully with reference to the accompanying drawings.

The present disclosure relates to a synchronizing processing between sound and image in a display apparatus with dual systems and dual display structures, namely, a display apparatus with a first controller (first hardware system), a second controller (second hardware system), a first display and a second display. A structure, function, implementation and other aspects of a display apparatus with a dual system hardware structure are illustrated below in detail first.

For user's convenience, the display apparatus is usually provided with various external apparatus interfaces so as to connect with different peripherals or cables to realize corresponding functions. When a high-definition camera is connected to an interface of the display apparatus, if a hardware system of the display apparatus has no hardware interface for a high-pixel camera for receiving source codes, data received from the camera cannot be presented on a display screen of the display apparatus.

Moreover, limited by the hardware structure, a hardware system of a conventional display apparatus only supports one-path hardware decoding resource, and usually only supports video decoding of 4K resolution to the greatest extent. Therefore, when video chat is performed while watching a network television, the hardware decoding resource (usually a GPU in the hardware system) needs to be used to decode a network video so as not to reduce the definition of the network video. In this case, a video chat picture can only be processed in a mode of adopting a general-purpose processor (for example, a CPU) in the hardware system to perform software decoding on the video.

A data processing burden of the CPU will be greatly increased by adopting the software decoding to process the video chat picture. When the data processing of the CPU is overburdened, problems, for example the chat picture is stuck or is not fluent, may occur. Further, due to a limited data processing capacity of the CPU, when CPU software decoding is adopted to process the chat picture, multi-path video call cannot be realized usually. When a user wants to have video chat with multiple users simultaneously at the same chat scenario, a limited access situation will occur.

In view of all the above aspects and in order to overcome the above defects, the present disclosure provides a dual-hardware system architecture so as to realize multi-path video chat data (at least one path of local video).

Terms in the present disclosure are described below with reference to the drawings first. It should be noted that explanations of the terms below are only intended to make the content of the present disclosure easier to understand, and does not intend to limit the protection scope of the present disclosure.

The term "remote controller" used in all the embodiments of the present disclosure, refers to a component of an electronic device (for example, the display apparatus disclosed in the present disclosure), and the component wirelessly controls the electronic device within a short distance range. The component generally may be connected with the electronic device through an infrared ray and/or radio frequency (RF) signal and/or Bluetooth®, and may also include functional modules such as WiFi, a wireless USB, Bluetooth® and a motion sensor. For example, a handheld touch remote controller, uses a user interface in a touch screen to replace most physical built-in hard keys in a general remote control device.

The term "hardware system" used in all the embodiments of the present disclosure, may refer to an entity unit comprising mechanical, optical, electric and magnetic devices such as an integrated circuit (IC) and a printed circuit board (PCB) and having computing, controlling, storing, inputting and outputting functions. In the embodiments of the present disclosure, the hardware system is also generally called a motherboard or a chip.

FIG. 1 illustrates a schematic diagram of an operation scenario between the display apparatus and a control device according to an embodiment. As shown in FIG. 1, a user may operate the display apparatus 200 through the control device 100.

The control device 100 may be a remote controller IO0A, which may be in communication with the display apparatus 200 according to an infrared communication protocol, a Bluetooth® communication protocol, a ZigBee communication protocol or other short-distance communication manner, and is configured to control the display apparatus 200 in wireless or other wired manner. The user may input a user command through keys, voice input, control panel input and the like on the remote controller IO0A to control the display apparatus 200. For example, the user may input the corresponding command through a volume up or volume down key, a channel control key, an up/down/left/right direction key, a voice input key, a menu key, an power key and the like, so as to realize the function of controlling the display apparatus 200.

The control device 100 may also be an intelligent device, such as a mobile terminal 100B, a tablet computer, a computer and a notebook computer, which may be in communication with the display apparatus 200 through a local area network (LAN), a wide area network (WAN), a wireless local area network (WLAN) or other networks, and controls the display apparatus 200 through an application corresponding to the display apparatus 200. For example, the application running on the intelligent device is configured to control the display apparatus 200. The application may provide various controls for the user on a screen associated with the intelligent device through an intuitive user interface (UI).

For example, software application can be installed on both the mobile terminal 100B and the display apparatus 200, so as to realize connection and communication between the mobile terminal 100B and the display apparatus 200 through a network communication protocol, and further realize the purposes of one-to-one control operation and data communication. For example, a control instruction protocol may be established between the mobile terminal 100B and the display apparatus 200, so that a remote control keyboard is synchronized onto the mobile terminal 100B, and the function of controlling the display apparatus 200 is realized by controlling the user interface on the mobile terminal 100B; and an audio and video content displayed on the mobile terminal 100B may also be transmitted onto the display apparatus 200 so as to realize a synchronous display function.

As shown in FIG. 1, the display apparatus 200 may further conduct data communication with a server 300 in various communication manners. In all the embodiments of the present disclosure, the display apparatus 200 is in wired communication connection or wireless communication connection with the server 300 through the local area network, the wireless local area network or the other networks. The server 300 may provide various contents and interaction for the display apparatus 200.

The display apparatus 200 includes a first display 201 and a second display 202. The first display 201 and the second display 202 are independent of each other. A dual-hardware control system is adopted between the first display 201 and the second display 202.

The first display 201 and the second display 202 display different images. For example, the first display 201 may be used for displaying of a conventional television program, and the second display 202 is used for displaying of additional information such as a notification message and a voice assistant.

Alternatively, the content displayed on the first display 201 and the content displayed on the second display 202 are independent of each other and do not affect each other. For example, when the first display 201 plays a television program, the second display 202 displays information such as time, weather, temperature and a reminder message irrelevant to the television program.

Alternatively, the content displayed on the first display 201 and the content displayed on the second display 202 may be related. For example, when the first display 201 plays a main image of a video chat, the second display 202 may display information such as a profile of the current user in the video chat and a duration of the video call.

Alternatively, a part or all of contents displayed on the second display 202 may be moved to the first display 201 for display. For example, the information such as time, the weather, temperature and the reminders displayed on the second display 202 may be moved to the first display 201 for display, and the second display 202 displays other information.

In addition, the first display 201 further displays a multiparty interactive image while displaying a traditional television program image, and the multiparty interactive image does not block the traditional television program image. The present disclosure does not limit the display modes of the traditional television program image and the multiparty interactive image. For example, the present disclosure may set positions and sizes of the traditional television program image and the multiparty interactive image according to the priority of the traditional television program image and the multiparty interactive image.

Taking an example where the priority of the traditional television program image is higher than that of the multiparty interactive image, an area of the traditional television program image is greater than that of the multiparty interactive image, and the multiparty interactive image may be on one side of the traditional television program image, or float on one corner of the traditional television program image.

On the one hand, the display apparatus 200 may be a liquid crystal display, an organic light emitting diode (OLED) display, or a projection display apparatus. On the other hand, the display apparatus may be a display system including an intelligent television or a display and a set top box. A specific display apparatus type, a size and a resolution are not limited. Those skilled in the art may understand that the display apparatus 200 may change in performance and configuration if necessary.

In addition to providing a broadcast reception television function, the display apparatus 200 may further provide an intelligent network television function which a computer supports. In some embodiments, the display apparatus may not have the broadcast reception television function.

As shown in FIG. 1, a camera may be connected to or disposed on the display apparatus 200, which is configured to present the image taken by the camera on the display apparatus or a display interface of other display apparatuses, so as to realize interactive chatting between users. Specifically, the images taken by the camera may be displayed on the display apparatus in a full screen, in a half screen or in any optional region.

As an alternative connecting mode, the camera is connected with a rear shell of the display apparatus through a connecting plate, and fixed in a middle of an upper side of the rear shell. As a manner for installation, the camera may be fixed at any position of the rear shell of the display apparatus if it can be ensured that its image capture region is not blocked by the rear shell. For example, the image capture region and a display direction of the display apparatus are the same.

As another connection alternative, the camera is connected with the rear shell of the display apparatus through a connecting plate or other candidate connectors which can be operated to lift up and lift down, and a motor is installed on the connector for lifting up or lifting down. When a user wants to use the camera or an application wants to use the camera, the camera ascends from the display apparatus, and when the camera does not need to be used, the camera may be embedded into the rear shell, so as to protect the camera from being damaged and protect privacy of the user.

As an embodiment, the camera adopted by the present disclosure may be 16 million pixels so as to achieve the purpose of ultra-high-definition display. In actual scenarios, the camera may use higher or lower than the 16 million pixels.

After the camera is installed on the display apparatus, the contents displayed on the display apparatus in different scenarios may be integrated in various different manners, so as to achieve the function which cannot be realized by a conventional display apparatus.

For example, a user may perform video chat with at least one other user while watching a video. The video may be presented as a background image, and a window of the video chat is displayed on the background image. Vividly, the function may be called "chatting while watching".

Alternatively, in the "chatting while watching" scenario, at least one way video chat is performed among terminals while a live video or a network video is watched.

In another embodiment, a user may perform video chat with at least one other user while in an education application for learning. For example, a student may remotely interact with a teacher while learning the content in an education application. Vividly, the function may be called "chatting while learning".

In another embodiment, a user performs video chat with a gamer in a game while playing a card game. For example, the user may remotely interact with other gamers while entering into a game application to participate in the game. Vividly, the function may be called "playing while watching".

Alternatively, a game scene is integrated with a video image, and a head image in the video image is cut out to replace that in the game image, so as to improve user experience.

Alternatively, in motion sensing games (for example, ball playing, boxing, running and dancing), human body postures and motions are obtained through the camera, and body detecting and tracking as well as human skeleton key point data detection are performed and then they are integrated with animation in the game to realize the games such as sports and dancing.

In another embodiment, a user may perform video and voice interaction with at least one other user in a karaoke application. Vividly, the function may be called "watching while singing". Alternatively, when at least one user enters the application in the chat scene, one song may be recorded by multiple users.

In another embodiment, a user may turn on the camera locally to obtain images and videos. Vividly, the function may be called "looking into a mirror".

In some other embodiments, more functions may further be added or the above functions are reduced. The present disclosure does not specifically limit the functions of the display apparatus.

Figure 2:
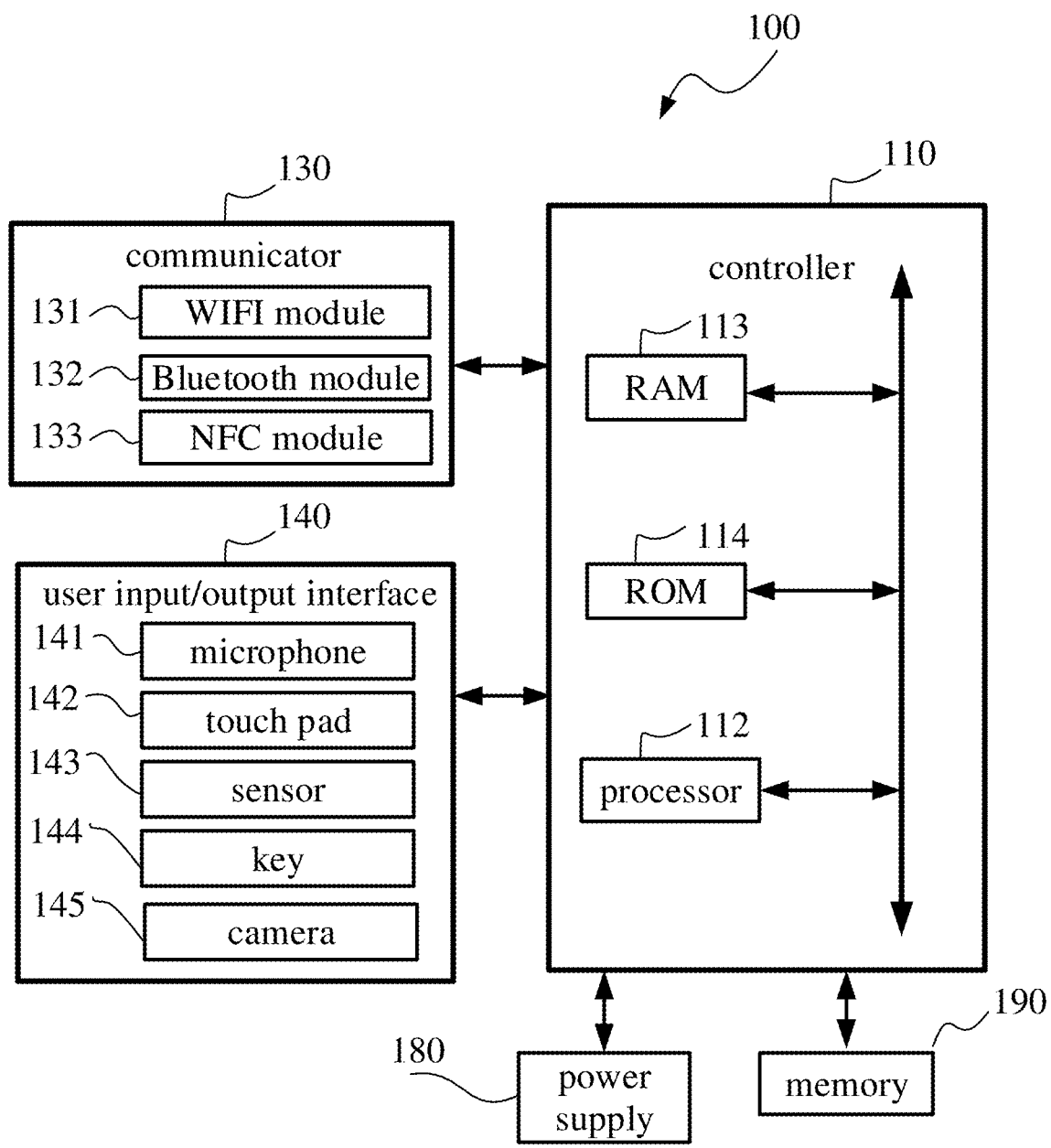
FIG. 2 illustrates a configuration block diagram of a control device 100 according to an exemplary embodiment.

FIG. 2 illustrates a configuration block diagram of a control device 100 according to an exemplary embodiment. As shown in FIG. 2, the control device 100 includes a controller 110, a communicator 130, a user input/output interface 140, a memory 190, and a power supply source 180.

The control device 100 is configured to control the display apparatus 200, receive an input operation command from a user, and convert the input operation command into an instruction which can be recognized and responded by the display apparatus 200. The control device plays an interaction role between the user and the display apparatus 200. For example, the user operates a channel up or channel down key on the control device 100, and the display apparatus 200 responds to a command corresponding to the channel up or channel down key.

In some embodiments, the control device 100 may be an intelligent device. For example, the control device 100 may install various applications for controlling the display apparatus 200 according to user's needs.

In some embodiments, as shown in FIG. 1, the mobile terminal 100B or other intelligent electronic device may play a similar function of the control device 100 after installation of the application for controlling the display apparatus 200. For example, the user may realize the function of the physical key of the control device 100 by installing the application and through various function keys or virtual buttons on a graphical user interface provided on the mobile terminal 100B or other intelligent electronic devices.

The controller 110 includes a processor 112, an RAM 113, an ROM 114, a communication interface and a communication bus. The controller 110 is configured to control running and operation of the control device 100, communication cooperation between all internal units, and external and internal data processing functions.

Under control of the controller 110, the communicator 130 realizes communication of a control signal and a data signal with the display apparatus 200. For example, a user input signal is sent to the display apparatus 200. The communicator 130 may include at least one of communication modules such as a WIFI module 131, a Bluetooth® module 132, and an NFC module.

In the user input/output interface 140, the input interface includes at least one of input interfaces such as a microphone 141, a touch pad 142, a sensor 143, a key 144, and a camera 145. For example, the user may realize a user command input function through actions such as voice, touch, gesture and pressing, and the input interface converts an analog signal into a digital signal, and converts the digital signal into a corresponding instruction signal to be sent to the display apparatus 200.

The output interface includes an interface for sending a user command to the display apparatus 200. In some embodiment, the output interface may be an infrared interface, or a radio frequency interface. For example, when the output interface is an infrared signal interface, the user input command needs to be converted into an infrared control signal according to an infrared control protocol, so as to be sent to the display apparatus 200 through an infrared sending module. For another example, when the output interface is an radio frequency signal interface, the user input command needs to be converted into a digital signal, then it is modulated according to a radio frequency control signal modulation protocol, and then sent to the display apparatus 200 through a radio frequency sending module.

In some embodiments, the control device 100 includes at least one of the communicator 130 and the output interface. The communicator 130, such as WIFI, Bluetooth®, NFC and other modules, is configured in the control device 100, so that the user input command may be encoded through a WIFI protocol, or a Bluetooth® protocol or an NFC protocol to be sent to the display apparatus 200.

The memory 190 is configured to store various running programs, data and application for driving and controlling the control device 100 under control of the controller 110. The memory 190 may store various control signal instructions input from a user.

The power supply 180 is configured to provide power support for all electrical elements of the control device 100 under control of the controller 110. The power supply 180 may adopt a battery and a relevant control circuit to realize power supply.

Figure 3:
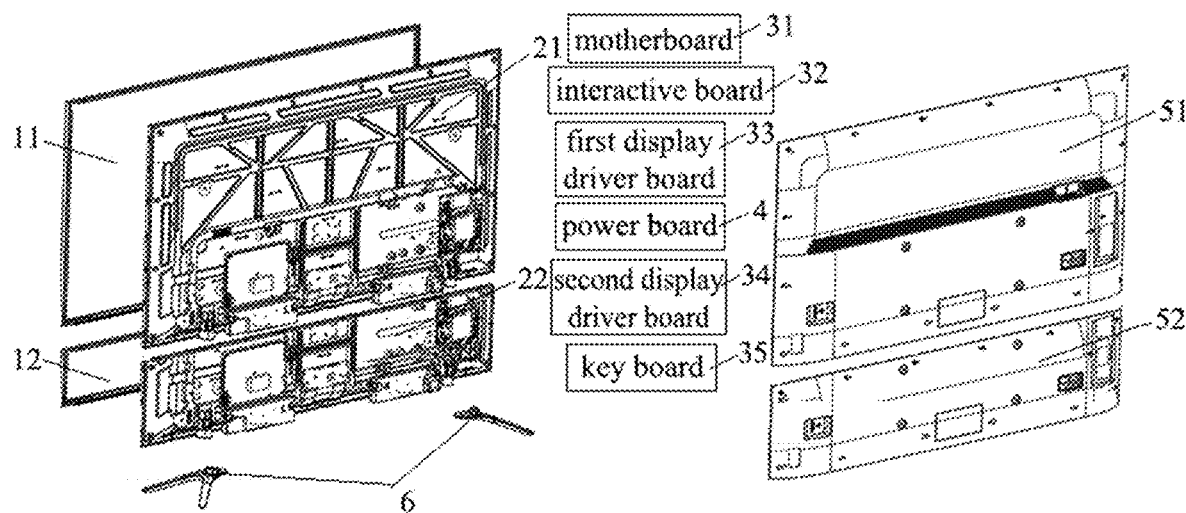
FIG. 3 illustrates a schematic diagram of a hardware structure of a hardware system in a display apparatus 200 according to an exemplary embodiment.

FIG. 3 illustrates a schematic diagram of a hardware structure of a hardware system in the display apparatus 200 according to an exemplary embodiment. For the convenience of illustration, in FIG. 3, the display apparatus 200 is indicated by taking a liquid crystal display screen as an example.

As shown in FIG. 3, the display apparatus 200 includes: a first panel 11, a first backlight component 21, a motherboard 31, an interactive board 32, a first display driver board 33, a second panel 12, a second backlight component 22, a second display driver board 34, a power board 4, a first rear shell 51, a second rear shell 52, and a base 6.

The first panel 11 is configured to present an image of the first display 201 for a user. The first backlight component 21 is located below the first panel 11, usually includes some optical components, and is configured to supply sufficient brightness and uniformly-distributed light sources so that the first panel 11 can display an image properly. The first backlight component 21 further includes a first backplate (not shown in the figure). The motherboard 31, the interactive board 32, the first display driver board 33 and the power board 4 are disposed on the first backplate, and some convex structures are usually punched on the first backplate. The motherboard 31, the interactive board 32, the first display driver board 33 and the power board 4 may be disposed on one board, or disposed on different boards respectively. The first rear shell 51 houses the first panel 11 so as to hide parts such as the first backlight component 21, the motherboard 31, the interactive board 32, the first display driver board 33 and the power board 4 of the display apparatus 200 to make the apparatus aesthetic.

A main function of the first display driver board 33 is: performing thousands backlight partition control through a PWM signal and a Localdimming signal transmitted from a first controller on the motherboard 31, wherein the control is changed according to the image content, and receiving a VbyOne display signal sent from the first controller on the motherboard 31 after establishing handshake with the first controller on the motherboard 31, and converting the VbyOne display signal into an LVDS signal, so as to realize the image display of the first display 201. The base 6 is configured to support the display apparatus 200. It is noted that only one form of base design is shown in the figure, and the skilled in the art can design the base in other forms according to product demands.

The second panel 12 is configured to present an image of the second display 202 for a user. The second backlight component 22 is located below the second panel 12, usually includes some optical components, and is configured to provide sufficient brightness and uniformly-distributed light sources so that the second panel 12 can display an image properly. The second backlight component 22 further includes a second backplate (not shown in the figure). The second display driver board 34 is disposed on the second backplate, and some convex structures are usually punched on the second backplate. The second display driver board 34 is fixed to a convex through a screw or a hook. The second display driver board 34 may be disposed on one board, or disposed on different boards respectively. The second rear shell 52 houses the second panel 12 so as to hide parts such as the second backlight component 22, a conversion driver board 35, a second TCON board 34b and a key board 36 of the display apparatus 200 to make the apparatus aesthetic.

Alternatively, in FIG. 3, a key board 35 is further included. The key board 35 may be disposed on the first backplate or the second backplate, which is not limited by the present disclosure.

In addition, the display apparatus 200 may further include a sound reproduction apparatus (not shown in the figure), such as a speaker component, for example, an I2S interface including a power amplifier (AMP) and a speaker, and the like, configured to realize sound reproduction. Usually, the speaker component at least can realize two channel sound outputs; and when it is necessary to have Dolby Atmos effect, more components are needed to output multi-channel sound, which will not be discussed further herein.

It should be noted that the display apparatus 200 may further use an OLED. In this case, modules associated with the display apparatus 200 are changed accordingly, which is not discussed further herein.

Figure 4:
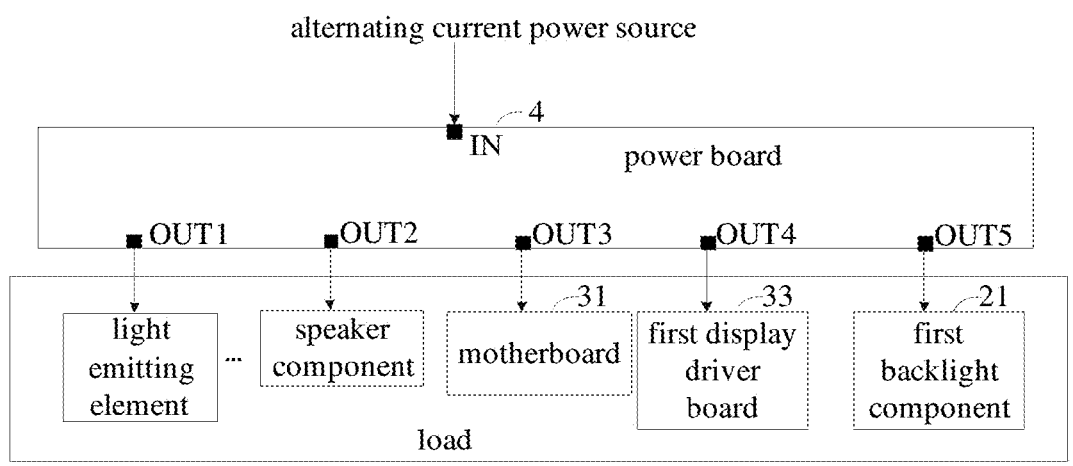
FIG. 4 illustrates a schematic diagram of a connection between a power board and a load.

FIG. 4 shows a schematic diagram of a connection of the power board and a load. As shown in FIG. 4, the power board 4 includes an input IN and an output OUT (a first output OUT1, a second output OUT2, a third output OUT3, a fourth output OUT4 and a fifth output OUT5 are shown in the figure), where the input IN is connected with commercial power, the output OUT is connected with a load, for example, the first output OUT1 is connected with a light emitting element (e.g. a light strip, or a self-lit device, and the like), the second output OUT2 is connected with the speaker component, the third output OUT3 is connected with the motherboard 31, the fourth output OUT4 is connected with the first display driver board 33, and the fifth output OUT5 is connected with the first backlight component 21. The power board 4 needs to convert alternating current to a direct current required for the load. Moreover, the direct current usually has different requirements, for example, the speaker component requires 18V, the panel requires 12V/18V, and the like.

For the convenience of description, one hardware system in the dual-hardware system architecture is called the first hardware system or the first controller, and the other hardware system is called the second hardware system or the second controller. The first controller includes various processors and interfaces, and various modules connected with the first controller through the various interfaces. The second controller contains various processors and interfaces, and various modules connected with the second controller through the various interfaces. The first controller and the second controller may install relatively independent operation systems respectively, and the operation system of the first controller may be in mutual communication with the operation system of the second controller through a communication protocol. For example, a framework layer in the operation system of the first controller and a framework layer in the operation system of the second controller may be in communication for command and data transmission, so that two independent but related subsystems coexist in the display apparatus 200.

Figure 5:
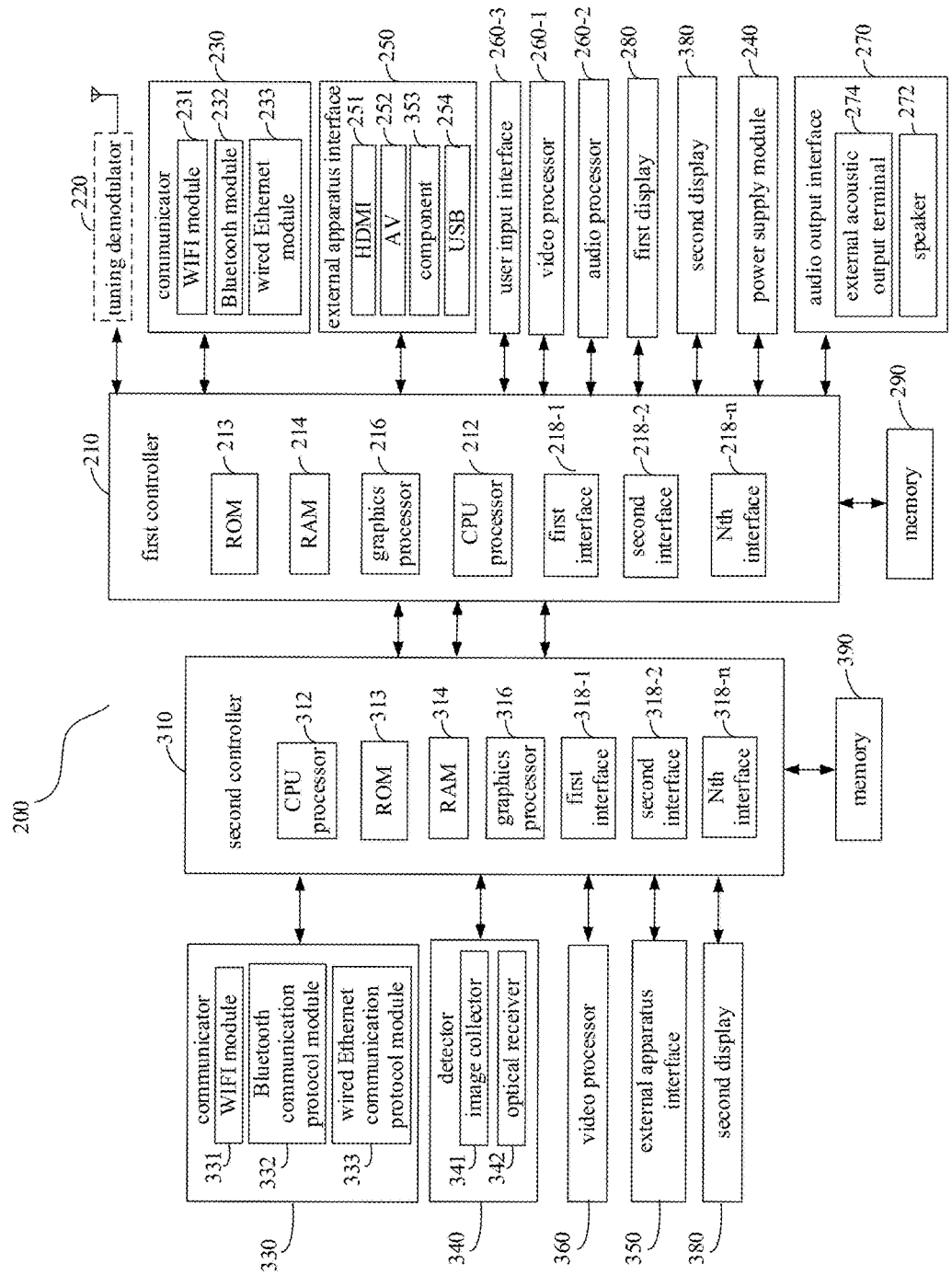
FIG. 5 illustrates a block diagram of a hardware architecture of a display apparatus 200 shown in FIG. 3.

The dual-hardware architecture of the present disclosure is further discussed below with reference to FIG. 5. It should be noted that FIG. 5 is only an illustration of the dual-hardware architecture of the present disclosure, and can not construct as a limitation to the present disclosure. In a scenario, the two hardware systems may include more or less hardware or interfaces according to needs.

FIG. 5 illustrates a block diagram of the hardware architecture of the display apparatus 200 as shown in FIG. 3. As shown in FIG. 5, the hardware system of the display apparatus 200 may include the first controller 210 and the second controller 310, and a module connected with the first controller 210 or the second controller 310 through interfaces.

The first controller 210 may be disposed on the motherboard 31 as shown in FIG. 3. Alternatively, the first controller 210: mainly realizes a traditional television function (for example, it may be connected with external set top box and the like). The second controller 310 may be disposed on the second display driver board 34 as shown in FIG. 3. Alternatively, the second controller 310 may be configured to receive an instruction sent from the first controller, and control a second display 380 to display a corresponding image.

The module(s) connected with the first controller 210 may include a tuning demodulator 220, a communicator 230, an external apparatus interface 250, a memory 290, a user input interface 260-3, a video processor 260-1, an audio processor 260-2, a first display 280 (namely, the first display 201 in FIG. 1), an audio output interface 270, and a power supply module 240. In other embodiments, the first controller 210 may also be connected with more or less modules.

The tuning demodulator 220 is configured to perform modulation-demodulation processing such as amplification, frequency mixing and resonance on broadcast television signals received in a wired or wireless manner, so as to demodulate an audio and video signal carried in a television channel frequency selected by a user from multiple wireless or wired broadcast television signals, and additional information (e.g. an EPG data). According to different broadcast signal systems, the tuning demodulator 220 may have various signals, for example, terrestrial broadcast, wired broadcast, satellite broadcast or Internet broadcast. According to different modulation types, modulation may be a digital modulation or an analog modulation. According to different types of television signals, the tuning demodulator 220 may demodulate analog signals and/or digital signals.

The tuning demodulator 220 is further configured to respond to the television channel frequency selected by a user and the television signal carried in the frequency under control of the first controller 210 according to a user's selection.

In some other exemplary embodiments, the tuning demodulator 220 may also be in external device, such as an external set top box. In this way, the set top box outputs the television audio and video signal after modulation and demodulation to be input into the display apparatus 200 through the external apparatus interface 250.

The communicator 230 is a component in communication with an external device or an external server according to various communication protocols. For example, the communicator 230 may include a WIFI module 231, a Bluetooth® communication protocol module 232, a wired Ethernet communication protocol module 233, an infrared communication protocol module and other network communication protocol modules or near field communication protocol modules (not shown in the figure).

The display apparatus 200 may establish control signal and data signal connection with an external control device or a content providing device through the communicator 230. For example, the communicator may receive a control signal from the remote controller 100 according to control of the first controller 210.

The external apparatus interface 250 is a component providing data transmission between the first controller 210 and the external other devices. The external apparatus interface 250 may be connected with the external devices such as a set top box, a game apparatus and a notebook computer in a wired/wireless manner, and may receive data from an external device, such as a video signal (e.g. an motion image), an audio signal (e.g. music), and additional information (e.g. EPG).

The external apparatus interface 250 may include: any one or more of a high definition multimedia interface (HDMI) interface also called HDMI251, a composite video blanking synchronization (CVBS) interface also called AV252, an analog or digital component interface also called component 253, a universal serial bus (USB) interface also called 254, a red green blue (RGB) interface (not shown in the figure). The present disclosure does not intend to limit the number and type of the external apparatus interface.

The first controller 210 is configured to control working of the display apparatus 200 and respond to user's operation by running various software applications (e.g. operation system and/or various applications) stored on the memory 290.

As shown in FIG. 5, the first controller 210 includes a read only memory ROM 213, a random access memory RAM 214, a graphics processor 216, a CPU 212, a communication interface 218, and a communication bus. The ROM 213, RAM 214, the graphics processor 216, the CPU 212 and the communication interface 218 are connected through the communication bus.

The ROM 213, is configured to store various system start-up instructions. For example, when a power-on signal is received, a power supply of the display apparatus 200 begins to start, the CPU 212 runs the system start-up instruction in the ROM to copy the operation system stored in the memory 290 into the RAM 214 so as to begin to run and start the operation system. After the operation system is started, the CPU 212 copies the various applications in the memory 290 into the RAM 214 again, and then, begins to run and start the various applications.

The graphics processor 216, is configured to generate various graphic objects, such as an icon, an operation menu, and user input command display graphics. The graphics processor 216 includes an arithmetic unit, which performs arithmetic by receiving various interactive command input from a user, and displays various objects according to a display attribute, and includes a renderer, which generates the various objects obtained based on the arithmetic unit and displays the rendered result on the first display 280.

The CPU 212, is configured to execute the operation system and the application instructions stored in the memory 290, and execute the various applications, data and content according to various input interactive commands received from outside, so as to finally display and play the various audio and video contents.

In some exemplary embodiments, the CPU 212 may include multiple processors. The multiple processors may include one main processor and one or more sub processor. The main processor is configured to execute some operation of the display apparatus 200 in a pre-power-up mode, and/or the operation of displaying an image in a normal mode. The one or more sub processor is configured to execute operations in standby mode and the like.

The communication interface 218 may include a first interface 218-1 to an nth interface 218-n. These interfaces may be network interfaces connected to external devices via network.

The first controller 210 may control operations of the display apparatus 200 associated with the first display 280. For example, in response to receiving a user command for selecting to display a UI object on the first display 280, the first controller 210 may perform the operation associated with the object selected by the user command.

The first controller 210 may control the operations of the display apparatus 200, associated with the second display 380. For example, in response to receiving a user command for selecting to display a UI object on the second display 380, the first controller 210 may execute the operation associated with the object selected by the user command.

The object may be any one of optional objects, such as a hyperlink or an icon. The operation associated with the selected object, may be, for example, operation for displaying a connection to a hyperlink page, document, image and the like, or operation for launching an application corresponding to the icon. The user command for selecting a UI object, may be a command input via various devices (e.g. a mouse, a keyboard, a touch pad and the like) connected to the display apparatus 200, or a voice command corresponding to a voice spoken by a user.

The memory 290 includes and stores various software modules configured to drive and control the display apparatus 200. For example, the various software modules stored in the memory 290 includes: a basic module, a detection module, a communication module, a display control module, a browser module, various service modules, and the like (not shown in the figure).

Meanwhile, the memory 290 is further configured to store external data and user data, images of all items in the various user interfaces, and a visual effect image of a focus.

The user input interface 260-3 is configured to send the input signal from a user to the first controller 210, or transfer the signal output from the first controller 210 to the user. For example, the control device (e.g. the mobile terminal or the remote controller) may send the input signals, such as a power signal, a channel selection signal and a volume adjusting signal, input from a user to the user input interface, and then the input signals are forwarded to the first controller 210 through the user input interface 260-3. Or the control device may receive the output signals, such as audio, video and data, processed by the first controller 210 and output from the user input interface 260-3, display the output signals, or output the output signals in an audio or vibration form.

In some embodiments, a user may input a user command on the graphical user interface (GUI) displayed on the first display 280, and then the user input interface 260-3 receives the user input command through the graphical user interface (GUI). Or, the user may input a user command by inputting a certain voice or gesture, and then the user input interface 260-3 recognizes the voice or the gesture through the sensor so as to receive the user input command.

The video processor 260-1 is configured to receive a video signal, and perform video data processing such as decompression, decoding, scaling, noise reduction, frame rate conversion, resolution conversion and image synthesis according to a standard encoding and decoding protocol of the input signal so as to obtain the video signal for directly being displayed on the first display 280.

For example, the video processor 260-1 includes a demultiplexing module, a video decoding module, an image synthesis module, a frame rate conversion module, a display formatting module, and the like (not shown in the figure).

The first display 280 is configured to receive an image signal input from the video processor 260-1, and display the video content, images and a menu control interface. The first display 280 includes a display component for presenting images and a driving component for driving image display. The video content displayed may come from the video in the broadcast signal received by the tuning demodulator 220, or the video content input from the communicator or external device interface. The first display 280 simultaneously displays the user control interface UI generated in the display apparatus 200 and configured to control the display apparatus 200.

According to the different types of the first display 280, the driving component used for driving display is further included. Or, if the first display 280 is a projection display, a projection apparatus and a projection screen may further be included.

The audio processor 260-2 is configured to receive audio signals, and performs audio data processing such as decompression, decoding, noise reduction, digital-to-analog conversion and amplifying processing according to a standard encoding and decoding protocol of the input signal so as to obtain the audio signal for being played in the speaker 272.

The audio output interface 270 is configured to receive audio signals output from the audio processor 260-2 under control of the first controller 210. The audio output interface may include the speaker 272, or an external speaker output interface 274 output to an external sound-emitting apparatus, such as an external speaker interface or an earphone output interface.

In some other exemplary embodiments, the video processor 260-1 may include one or more chips. The audio processor 260-2 may also include one or more chips.

In some other exemplary embodiments, the video processor 260-1 and the audio processor 260-2 may be an individual chip, or be integrated in one or more chips together with the first controller 210.

The power supply module 240 is configured to provide electric power input from an external power source for the display apparatus 200 as power support under control of the first controller 210. The power supply module 240 may include a built-in power supply circuit installed in the display apparatus 200, or a power source installed outside the display apparatus 200, for example, a power interface is provided in the display apparatus 200 for connecting with external power source.

Similar to the first controller 210, as shown in FIG. 5, the module connected with the second controller 310 may include a communicator 330, a detector 340, a memory 390, and a second display 380 (namely, the second display 202 in FIG. 1). In some embodiments, the module may further include a user input interface, a video processor, an audio processor, a display, and an audio output interface (not shown in the figure). In some embodiments, there may be a power module (not shown in the figure) for independently supplying power to the second controller 310.

The communicator 330 is a component in communication with an external device or an external server according to various communication protocols. For example, the communicator 330 may include a WIFI module 331, a Bluetooth® communication protocol module 332, a wired Ethernet communication protocol module 333, an infrared communication protocol module and other network communication protocol modules or near field communication protocol modules (not shown in the figure).

The communicator 330 also mutually interacts with the communicator 230 of the first controller 210. For example, the WiFi module 231 in the hardware system of the first controller 210 is configured to be connected with the external network so as to generate network communication with an external server and the like. The WiFi module 331 in the hardware system of the second controller 310 is configured to be connected to the WiFi module 231 of the first controller 210, and is not directly connected with external network and the like, and the second controller 310 is connected with the external network through the first controller 210. Therefore, as for a user, a display apparatus in the above embodiment only displays a WiFi account.

The detector 340 is a component for the second controller 310 to collect an external environment signal or a signal interacting with the outside. The detector 340 may include an optical receiver 342, and a sensor configured to collect environment light intensity, which can adaptively display the parameter change and the like by collecting the environment light; and the detector 340 may further include an image collector 341, such as a webcam and a camera, which may be configured to collect external environment scenes, attribute of the user or interact with the user via gesture, may adaptively change the display parameter, and may also recognize a user's gesture, so as to realize the interactive function with the user.

The external apparatus interface 350, is a component for providing data transmission between the second controller 310 and the first controller 210 or the external other devices. The external apparatus interface may be connected with the external devices such as the set top box, a game apparatus and a notebook computer in a wired/wireless manner.

The video processor 360 is configured to process video signals.

The second controller 310 is configured to control working of the display apparatus 200 and respond to operation from a user by running various software control programs (e.g. a third-party application installed by the user) stored on the memory 290 and interacting with the first controller 210.

As shown in FIG. 5, the second controller 310 includes a read only memory ROM 313, a random access memory RAM 314, a graphics processor 316, a CPU 312, a communication interface 318, and a communication bus. The ROM 313, RAM 314, the graphics processor 316, the CPU 312 and the communication interface 318 are connected through the communication bus.

The ROM 313 is configured to store various system start-up instructions. For example, the CPU 312 runs the system start-up instruction in the ROM to copy the operation system stored in the memory 390 into the RAM 314 so as to begin to run and start the operation system. After the operation system is started, the CPU 312 copies the various applications in the memory 390 into the RAM 314 again, and then, begins to run and start the various applications.

The CPU 312 is configured to execute the operation system and the application instruction stored in the memory 390, perform transmission and interaction of communication, signal, data and instruction with the first controller 210, and execute the various applications, data and content according to various input interactive instructions received from outside, so as to finally display and play the various audio and video contents.

There are multiple communication interfaces 318. The communication interfaces 318 may include a first interface 318-1 to an nth interface 318-n. These interfaces may be network interfaces connected to external devices through network, or network interfaces connected to the first controller 210 through network.

The second controller 310 may control the operations of the display apparatus 200 associated with the second display 380. For example, in response to receiving a user command for selecting to display a UI object on the second display 380, the second controller 310 may execute the operation associated with the object selected by the user command.

The second controller 310 may control the operations of the display apparatus 200 associated with the first display 280. For example, in response to receiving a user command for selecting to display a UI object on the first display 280, the first controller 210 may execute the operation associated with the object selected by the user command.

The graphics processor 316 is configured to generate various graphic objects, such as an icon, an operation menu, and user input commands display graphics. The graphics processor 316 includes an arithmetic unit, which performs arithmetic by receiving various interactive commands input from a user, and displays various objects according to a display attribute; and includes a renderer, which generates the various objects obtained based on the arithmetic unit and displays the rendered result on the second display 380.

The graphics processor 316 of the second controller 310 and the graphics processor 216 of the first controller 210 may generate the various graphic objects. The difference lies in that if Application 1 is installed on the second controller 310, Application 2 is installed on the first controller 210, when the user is in the interface of Application 1 and a command input from a user is performed in Application 1, the graphics processor 316 of the second controller 310 generates a graphic object. When a user is in the interface of Application 2 and the command input from the user is performed in Application 2, the graphics processor 216 of the first controller 210 generates a graphic object.

Figure 6:
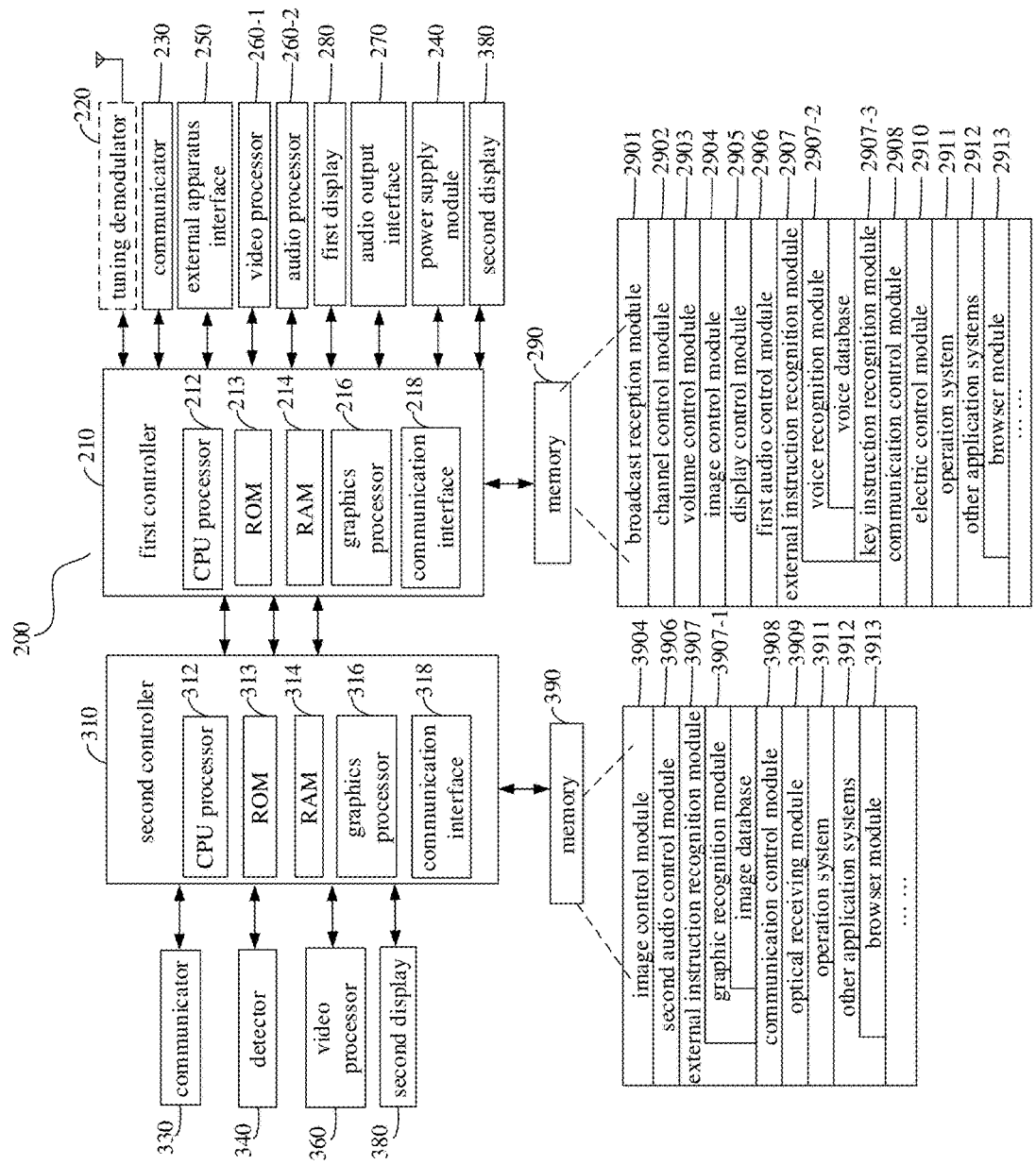
FIG. 6 illustrates a schematic diagram of functional configuration of a display apparatus according to an exemplary embodiment.

FIG. 6 illustrates a schematic diagram of functional configuration of the display apparatus according to an exemplary embodiment.

As shown in FIG. 6, the memory 390 of the second controller 310 and the memory 290 of the first controller 210 are configured to store the operation system, applications, content, user data and the like respectively, and run various operations for driving system of the first display 280 and the second display 380 and responding to a user under control of the second controller 310 and the first controller 210. The memory 390 and the memory 290 may include a volatile and/or nonvolatile memory.

The memory 290 is further configured to store a program for driving the first controller 210 in the display apparatus 200, and store built-in various applications of the display apparatus 200, various applications loaded by the user form external devices, various graphic user interfaces associated with the applications, various objects associated with the graphic user interfaces, user data information, and various internal data supporting the applications. The memory 290 is configured to store the system software such as an operation system (OS) kernel, a middleware and applications, and store input video data and audio data, and other user data.

The memory 290 is configured to store the video processor 260-1, the audio processor 260-2, the first display 280, the communicator 230, the tuning demodulator 220 and the input/output interface, driving programs and associated data.

For example, the memory 290 includes a broadcast reception module 2901, a channel control module 2902, a volume control module 2903, an image control module 2904, a display control module 2905, a first audio control module 2906, an external instruction recognition module 2907, a communication control module 2908, an optical receiving module 2909, an electric control module 2910, an operation system 2911, other applications 2912, a browser module 2913 and the like. The first controller 210 runs various software programs in the memory 290 to accomplish various functions, for example: a broadcast television signal reception and demodulation function, a television channel selection control function, a volume selection control function, an image control function, a display control function, an audio control function, an external instruction recognition function, a communication control function, an optical signal receiving function, an electric control function, supporting software manipulating platforms with various functions, and the browser function.

The memory 390 includes and stores various software modules for driving and controlling the display apparatus 200. For example, the various software modules stored in the memory 390 includes: a basic module, a detection module, a communication module, a display control module, a browser module, various service modules, and the like (not shown in the figure). Because the functions of the memory 390 and the memory 290 are similar, related descriptions may refer to that of the memory 290, which will omit herein.

For example, the memory 390 includes an image control module 3904, a second audio control module 3906, an external instruction recognition module 3907, a communication control module 3908, an optical receiving module 3909, an operation system 3911, other applications 3912, a browser module 3913 and the like. The first controller 210 runs the various software programs in the memory 290 to execute all kinds of functions, for example: an image control function, a display control function, an audio control function, an external instruction recognition function, a communication control function, an optical signal receiving function, an electric control function, supporting software manipulating platforms with various functions, and the browser function.

The difference lies in that the external instruction recognition module 2907 of the first controller 210 and the external instruction recognition module 3907 of the second controller 310 may recognize different instructions.

For example, when an image receiving device such as a camera is connected with the second controller 310, the external instruction recognition module 3907 of the second controller 310 may include a graphic recognition module 3907-1, and the graphic recognition module 3907-1 stores a graphic database. When receiving the external graphic instruction, the camera performs corresponding association with the instructions in the graphic database so as to make instruction control on the display apparatus. However, because a voice receiving device and the remote controller are connected with the first controller 210, the external instruction recognition module 2907 of the first controller 210 may include a voice recognition module 2907-2, and the voice recognition module 2907-2 stores a voice database. When receiving an external voice instruction, the voice receiving device performs corresponding association with the instructions in the voice database so as to make instruction control on the display apparatus. Similarly, the control device 100 such as the remote controller is connected with the first controller 210, and a key instruction recognition module 2907-3 performs instruction interaction with the control device 100.

Figure 7:
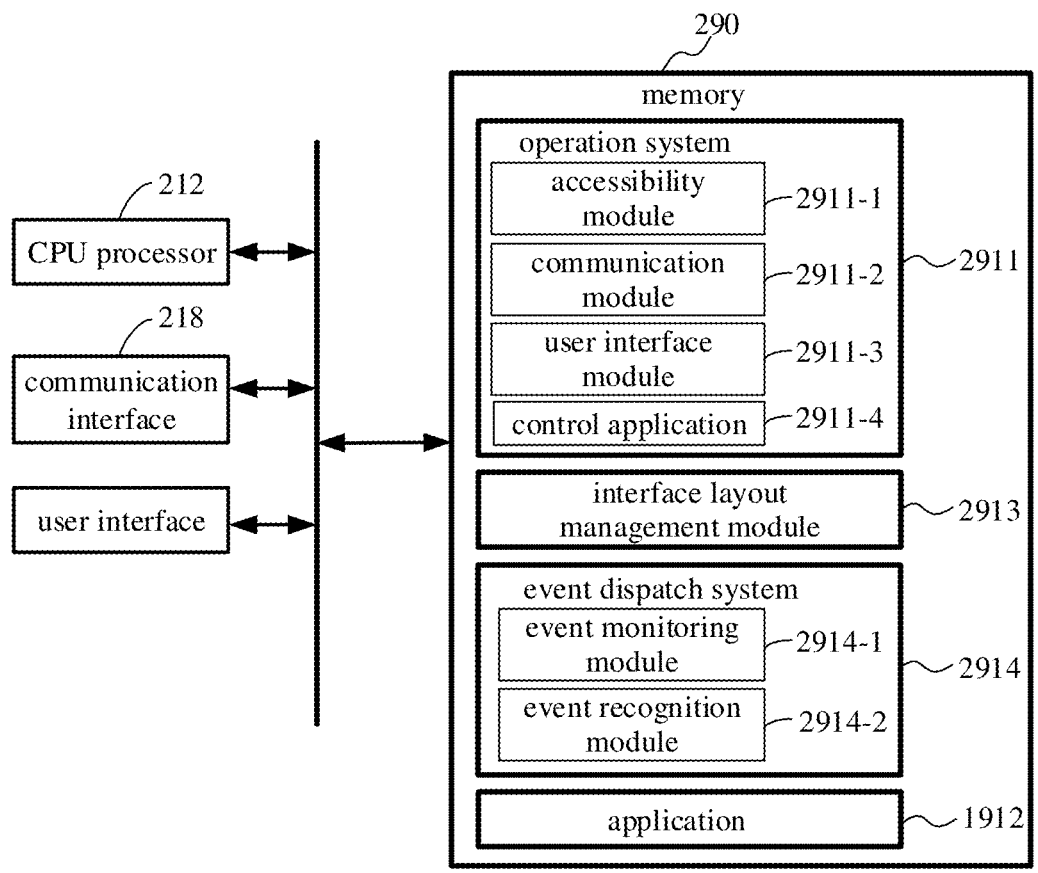
FIG. 7 illustrates a configuration block diagram of a software system in a display apparatus 200 according to an exemplary embodiment.

FIG. 7 illustrates a configuration block diagram of the software system in the display apparatus 200 according to the exemplary embodiment.

As for the first controller, as shown in FIG. 7, the operation system 2911 includes an operation software configured to process various basic system services and implement hardware-related tasks, and serves as a medium for completing data processing between the application and a hardware component.

In some embodiments, a part of the operation system kernel may include a series of software, and is configured to manage hardware resources of the display apparatus and provide service for other applications or software codes.

In some other embodiments, a part of the operation system kernel may include one or more device drivers. The device driver may be a group of software codes in the operation system, and helps to operate or control a device or hardware associated with the display apparatus. The driver may include codes for operating the video, audio and/or other multimedia components. For example, the driver includes a panel driver, a camera driver, Flash driver, WiFi driver and an audio driver.

An accessibility module 2911-1 is configured to modify or access an application, so as to realize access of the application and operation on its displayed content.

A communication module 2911-2 is configured to connect with other peripherals through related communication interface and communication network.

A user interface module 2911-3 is configured to provide an object displayed the user interface so as to allow access of the applications and user's operations.

A control application 2911-4 is configured to control process management, and includes a running time application and the like.

An event dispatch system 2914 may be implemented in the operation system 2911 or the applications 2912. In some embodiments, on one hand, the event dispatch system 2914 is realized in the operation system 2911 and realized in the applications 2912 simultaneously, configured to monitor various user input events, and perform a set of predefined corresponding operations based on recognition result of the various user input events.

An event monitor module 2914-1 is configured to monitor events or subevents input from the user input interface.

An event recognition module 2914-2 is configured to define various events input from the various user input interfaces, recognize the various events or subevents, and dispatch the various events or subevents to the processor so as to accomplish one or more corresponding processings.

The event or subevent refers to detection input from one or more sensor in the display apparatus 200, and input from external control devices (e.g. control device 100), for example, various subevents input via voice, gesture input subevents via a gesture, and a subevents input via a remote control key on the control device. For example, one or more subevents in the remote controller include various forms, including but not limited to one or combination of pressing up/down/left/right direction keys, a confirmation key, holding a key and the like, and operation of a non-physical key, such as moving, holding and releasing.

An interface layout management module 2913 directly or indirectly receives various user input events or subevents monitored by the event dispatch system 2914, and is configured to update a user interface layout, including but not limited to various operations associated with the interface layout, such as positions of all controls or child controls on the interface, a size or a position and level of a container.

Because the operating system 3911 of the second controller 310 and the operating system 2911 of the first controller 210 are similar in function, the related description may refer to that of the operation system 2911, which will omit herein.

Figure 8:
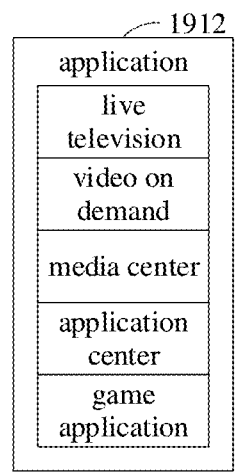
FIG. 8 illustrates an application layer of a display apparatus which has various applications in a display apparatus 200 according to an exemplary embodiment.

As shown in FIG. 8, an application layer of the display apparatus includes various applications running in the display apparatus 200.

An application layer 2912 of the first controller 210 may include but not limited to one or more applications, such as a video on demand application, an application center and a game application. An application layer 3912 of the second controller 310 may include but not limited to one or more applications, such as a live television application and a media center application. It should be noted that the applications respectively on the second controller 310 and the first controller 210 are determined according to the operation system and other design. The present disclosure does not intend to limit and divide the applications on the second controller 310 and the first controller 210.

Because the independent operation systems may be installed in the second controller 310 and the first controller 210 respectively, the two independent but related subsystems exist in the display apparatus 200. For example, the second controller 310 and the first controller 210 may be independently provided with Android and various applications to realize certain functions, and the second controller 310 and the first controller 210 realize certain functions in cooperation.

Figure 9:
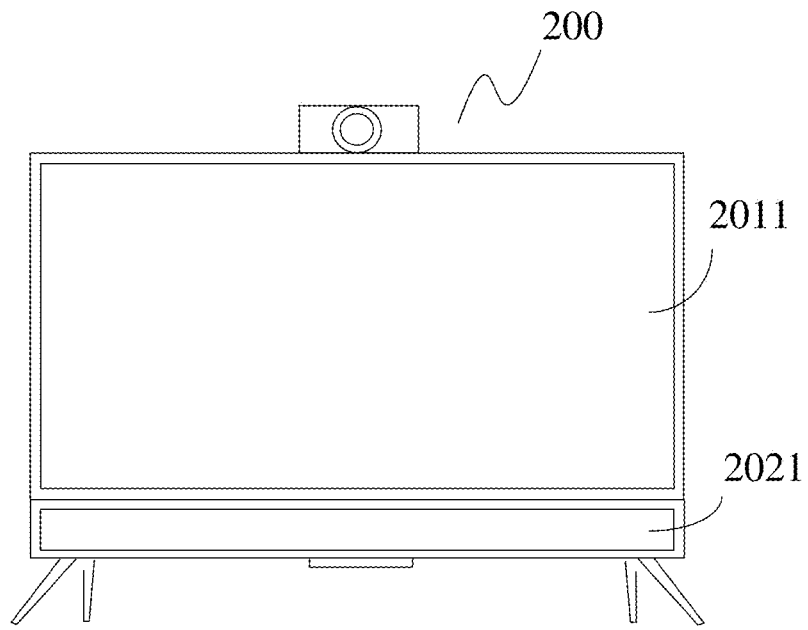
FIG. 9 illustrates a schematic diagram of a user interface in a display apparatus 200 according to an exemplary embodiment.

FIG. 9 illustrates a schematic diagram of the user interface in the display apparatus 200 according to an exemplary embodiment. As shown in FIG. 9, the user interface includes a first display region 2011 and a second display region 2021. Functions of the first display region 2011 and the second display region 2021 are basically the same. Only the first display region 2011 is illustrated below. For example, the first display region 2011 includes layout of one or more different items. The user interface further includes a selector for indicating the item is selected, and the position of the selector may be moved by user input so as to change position to select different items.

In some embodiments, the first display region 2011 is able to be scaled. "Scale" means that a size or a proportion of the first display region 2011 on a screen can be scaled up or scaled down, or a size or a proportion of the item in the display 201 on the screen can be scaled up or scaled down.

The "item" refers to a visual object displayed on a display region of the user interface in the display apparatus 200 so as to represent a corresponding content such as an icon, a thumbnail and a video clip. For example, the item may represent image content or video clip from a movie and a drama, audio content of music, application, or other user access historical information.

In addition, the item may represent an interface or a set of interfaces of the display apparatus 200 connected with an external device, or represent a name of the external device connected with the display apparatus. For example, a set of signal source interfaces, or a high definition multimedia interface (HDMI), a USB interface, and a PC interface.

It should be noted that the display region may present content of a video chat item, or present content of the application layer item (for example, a webpage video, video on demand (VOD) display, an application image).

The "selector" is used to indicate that any item has been selected, for example: a cursor or a focus. According to a position of the icon or a menu touched by a user in the display apparatus 200, information input is determined, so that a movement of a focus object is displayed on the display apparatus 200 to indicate a selection of an item, wherein one or more items may be selected or controlled.

A focus object refers to an object moved between items according to a user input. For example, position of a focus object is indicated or identified by drawing a bold line at the edge of an item. In other embodiments, the focus object is not limited to the above indication form, and may be a cursor and other tangible or intangible forms recognized by a user, for example, may be 3D deformation and other forms, or identification for text or image of a focus item such as a border line, a size, a color, transparency and a contour and/or a font may be changed.

The event dispatch system 2914 may monitor user input of various predefined events or subevents, and directly or indirectly provide control on the interface layout management module 2913 based on recognized events or subevents.

The interface layout management module 2913 is configured to monitor status of a user interface (including changes of positions and/or sizes of view area, item, focus or cursor), and may perform modification on the layout such as size, position and display priority, and/or adjust or modify the layout such as size or/and position, number, type, content of various item layout on the display region according to the events or subevents. In some embodiments, adjustment and modification of the layout include displaying or not displaying all view areas or the item content in the view areas on the screen.

The user input interface is configured to send an input signal from a user to the controller, or send a signal from the controller to a user. For example, the control device (e.g. a mobile terminal or a remote controller) may send a input signal, such as a power signal, a channel selection signal and a volume adjusting signal, input from the user via the user input interface, and then the input signal is forwarded to the controller through the user input interface. Or the control device may receive an output signal, such as audio, video and data, processed by the controller and output from the user input interface, display the output signal, or output the output signal in an audio or vibration form.

In some embodiments, a user may input a user command on the graphical user interface (GUI) shown on the display apparatus 200, and then the user input interface receives the user input command through the graphical user interface (GUI). Or, the user may input a user command by inputting a certain voice or gesture, and then the user input interface recognizes the voice or the gesture through the sensor so as to receive the user input command.

Figure 10:
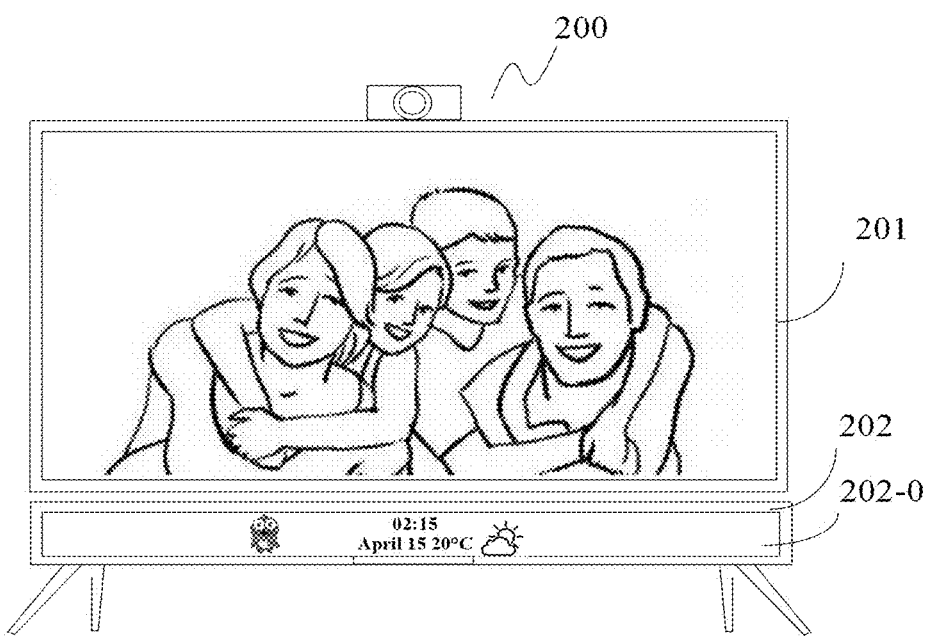
FIG. 10 illustrates a schematic diagram of a user interface in a display apparatus 200 according to an exemplary embodiment.
Figure 11:
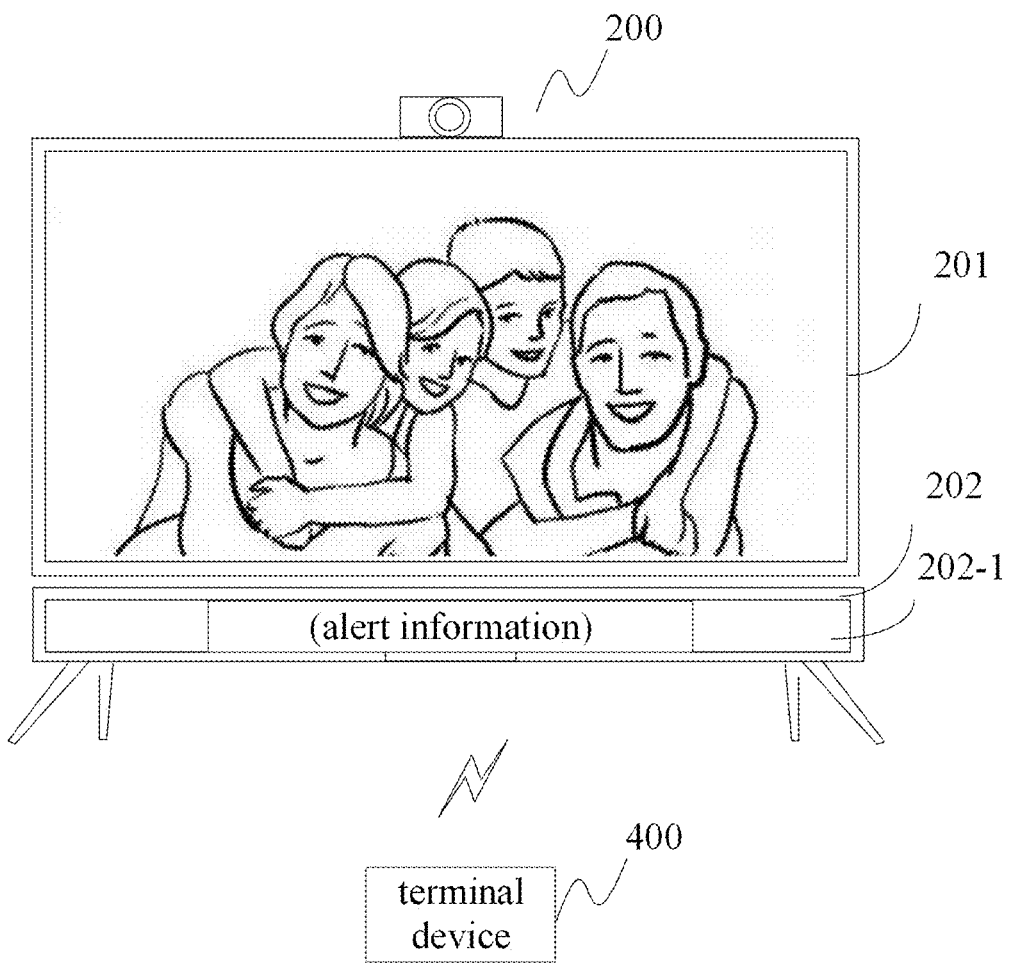
FIG. 11 illustrates a schematic diagram of an information alert interface in a display apparatus 200 according to an exemplary embodiment.

FIG. 10 to FIG. 13 illustrates a schematic diagram of the user interface in the display apparatus 200 according to an exemplary embodiment. For example, as shown in FIG. 10, the display includes a first display 201 and a second display 202. The playing content that the user is watching is displayed in the first display 201, and the playing content may be a television program, a video, an image, or a webpage being browsed and an application being used by a user. An initial interface 202-0 is displayed in the second display 202, and alternatively, the initial interface 202-0 may be configured to display time and/or weather and/or a cartoon image and the like. As shown in FIG. 11, when receiving a state sent from at least one terminal device 400 connected with the display apparatus 200, the controller generates alert information according to the state sent from the terminal device and display alert information interface 202-1 in the second display 202. Optionally, the controller may be the first controller 210 or the second controller 310. Specifically, when receiving the state sent from the terminal device 400, the first controller generates alert information according to the state sent from the terminal device and sends the alert information to the second controller 310, and the second controller 310 controls the second display 202 to display an information alert interface 202-1. Or when receiving state information sent from the terminal device 400, the second controller 310 generates alert information according to the state information sent from the terminal device and controls the second display 202 to display the information alert interface 202-1. The information alert interface 202-1 includes alert information for indicating the state of the at least one terminal device 400 connected with the display apparatus 200. For example, the terminal device 400 is various intelligent devices connected with the display apparatus 200 through a local area network, Internet, a cloud platform or Bluetooth®, including but not limited to a mobile phone, a tablet, a computer, and intelligent household appliances (for example, a video doorbell, a vacuum cleaning robot, an air conditioner, a refrigerator, a washing machine, a rice cooker, an intelligent lamp, an intelligent fan, a security device and the like). The alert information is used to indicate an abnormal failure, a current state, a task progress and the like of the terminal device 400, for example, the washing machine completes a task, an oven finishes a task and turns off, the refrigerator detects that a food is about to expire, the security device detects an abnormal condition, and someone rings the video doorbell, and meanwhile, while the content being watching is still displayed in the first display 201. FIG. 10 shows a frame image in a scenario without alert information, and FIG. 11 shows a frame image in a scenario with alert information.

Alternatively, after the first display is turned off, the controller may control the second display to continue normally displaying the alert information.

Figure 12:
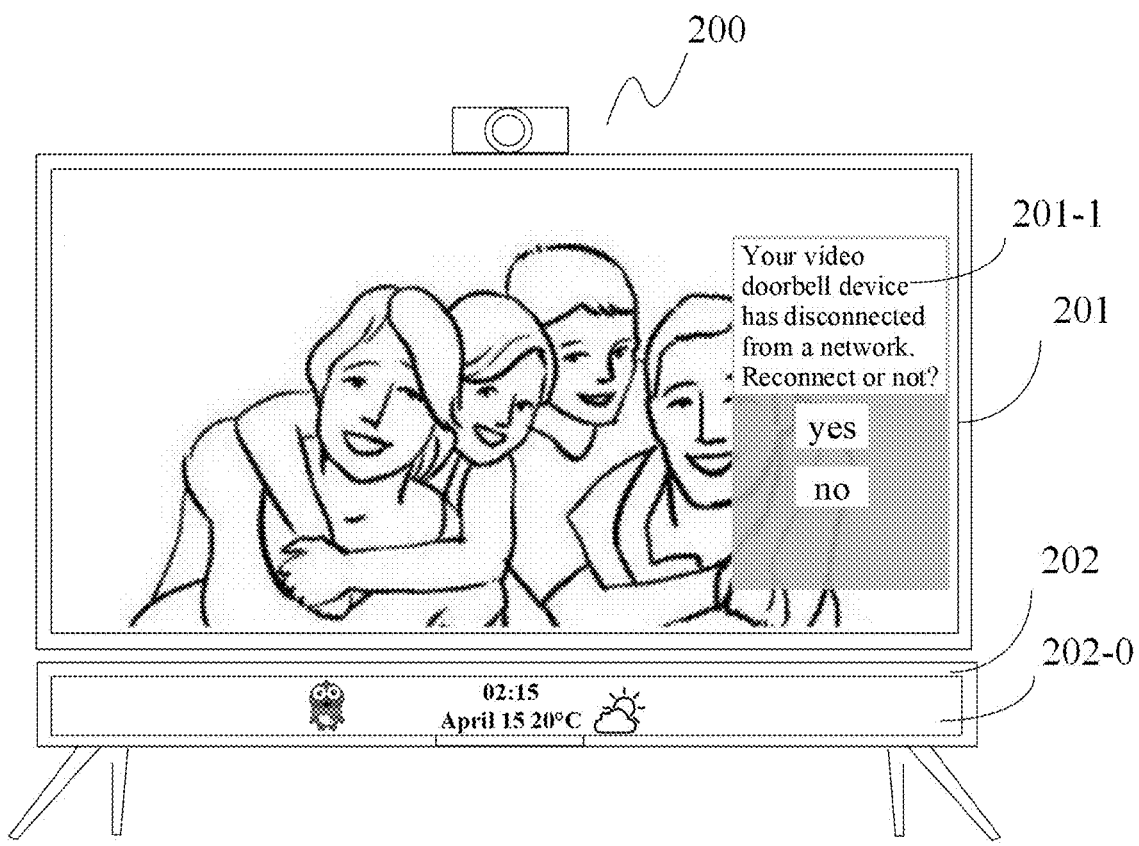
FIG. 12 illustrates a schematic diagram of details interface in a display apparatus 200 according to an exemplary embodiment.
Figure 13A:
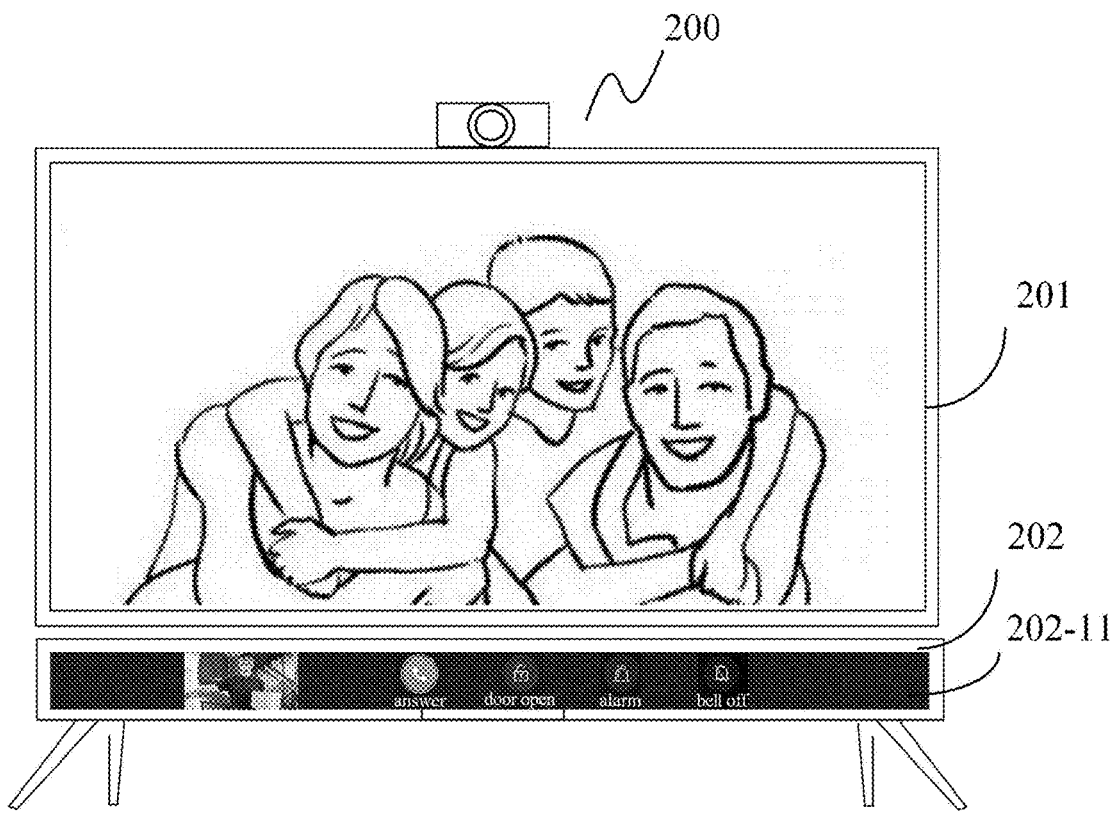
FIG. 13A illustrates a schematic diagram of an information alert interface in a display apparatus 200 according to an exemplary embodiment.
Figure 13B:
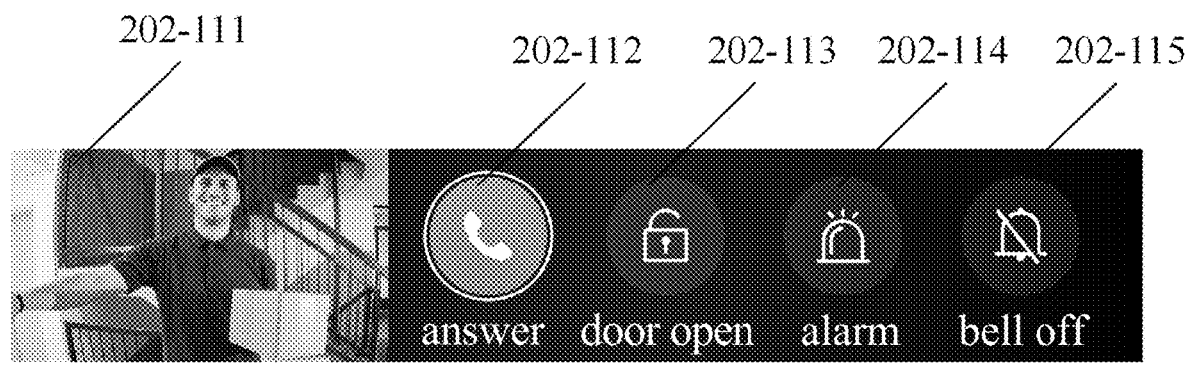
FIG. 13B illustrates a schematic diagram of an information alert interface in a display apparatus 200 according to an exemplary embodiment.
Figure 13C:
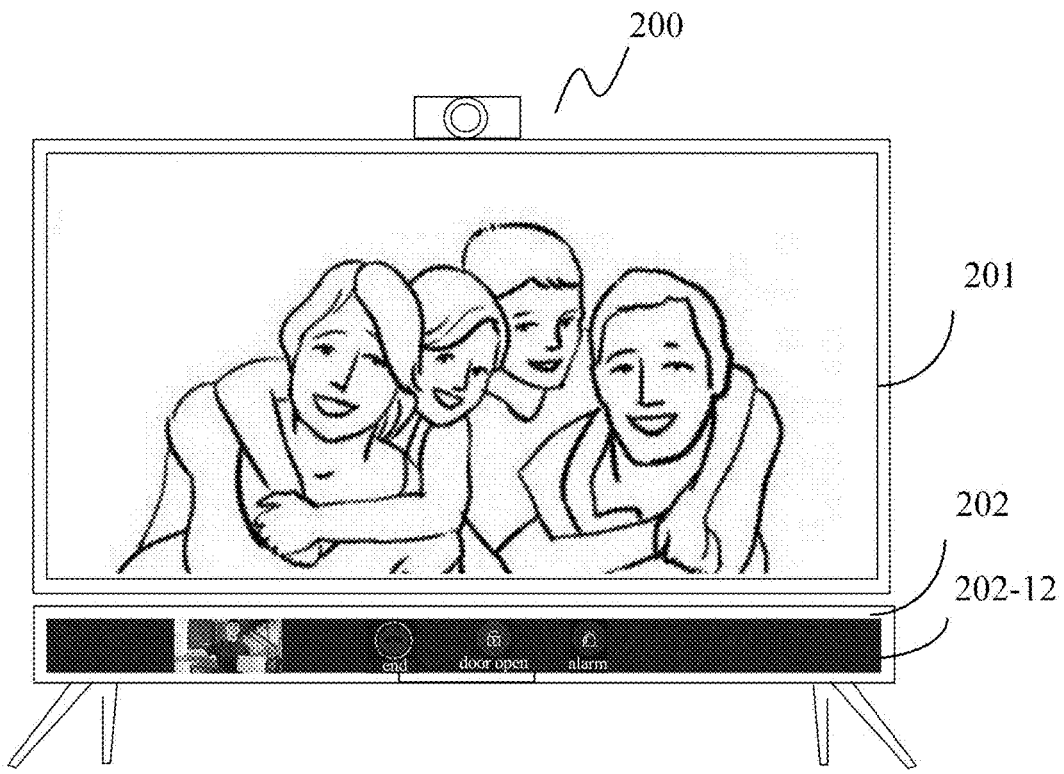
FIG. 13C illustrates a schematic diagram of an information alert interface in a display apparatus 200 according to an exemplary embodiment.
Figure 13D:
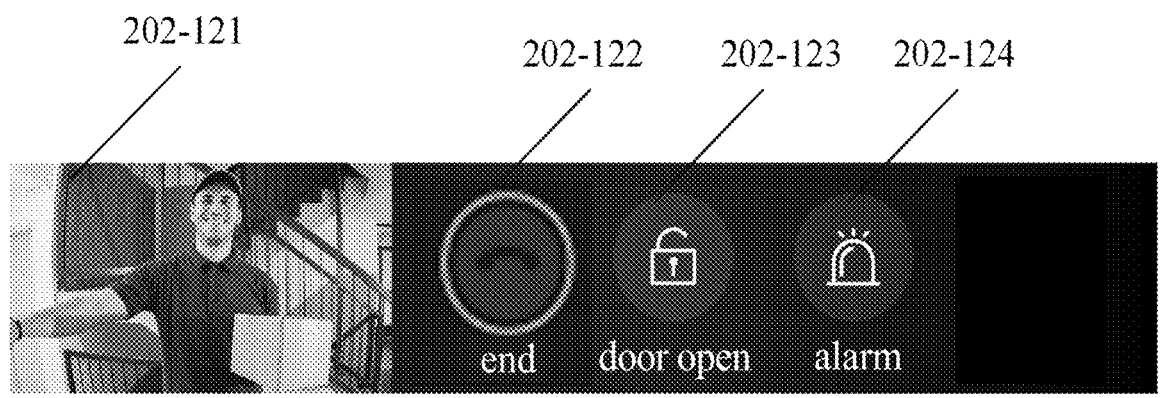
FIG. 13D illustrates a schematic diagram of an information alert interface in a display apparatus 200 according to an exemplary embodiment.

As shown in FIG. 12, when a first operation is performed on an alert information control in the information alert interface 202-1, that is, when a selection operation on an alert information control 202-11 is received through the selector, or a pressing operation performed by the user through a key of the control device is received via the user input interface 260-3, through control of the controller, the first display 201 displays a details interface 201-1 of the alert information in a floating window mode, and the second display 202 returns to an interface before displaying the alert information, for example, may return the initial interface 202-0.

For example, the information alert interface 202-1 may include the content as shown in FIG. 21A, such as a cartoon image, a terminal device picture, and operation prompt.

With reference to FIG. 2, in the display process of the details interface 201-1, the controller receives a command for closing the alert information through the user input interface 260-3, in response to the command, controls the first display 201 to close the details interface 201-1, and continues to display the content played by the user and displayed by the first display as shown in FIG. 10. For example, the command for closing the alert information may be sent from a user by operating the control device 100 (including the remote controller 100A, or an intelligent device, such as the mobile terminal 100B), for example, the user presses the "back" key on the remote controller to close the details interface 201-1.

As shown in FIG. 12, in response to a second operation on a device manipulation control in the details interface of the alert information, the device manipulation control selected by the user is displayed in the details interface 201-1 of the alert information, and the corresponding terminal device is controlled to perform an operation corresponding to the device manipulation control, wherein the second operation is a selection operation for the device manipulation control, received through the selector. For example, the details interface 201-1 includes: "your video doorbell device has disconnected from the network. Reconnect or not?", a "yes" control and a "no" control. According to the control checked by a user and received by a selector, a corresponding operation will be performed; and if the user select the control yes, the video doorbell is controlled to reconnect to the network.

FIG. 13A to FIG. 13D illustrate a schematic diagram of the information alert interface in the display apparatus 200 according to an exemplary embodiment. As shown in FIG. 13A to FIG. 13D, when the video doorbell is triggered, the information alert interface 202-1 in the second display 202 includes a first doorbell interface 202-11. The first doorbell interface 202-11 includes at least a video image 202-111 and a doorbell call answer control (an answer control for short) 202-112, for example, may further include a door open control 202-113, an alarm control 202-114, a bell off control 202-115 and the like. When a user checks the doorbell call answer control 202-112, the controller controls the second display to display a second doorbell interface 202-12 in response to a third operation for the doorbell call answer control 202-112, wherein the third operation is a selection operation for the doorbell call answer control 202-112 through the selector, the second display is controlled to display the second doorbell interface 202-12, and the second doorbell interface 202-12 includes a video image 202-121. For example, the second doorbell interface 202-12 further includes one or more of a doorbell call end control (an end control for short) 202-122, a door open control 202-123, and an alarm control 202-124. It should be understood that the video image 202-121 in the second doorbell interface 202-12 and the video image 202-111 in the first doorbell interface 202-11 are different frames in the same video.

For example, when the user checks the answer control 202-112 in the first doorbell interface 202-11, in response to a selection operation for the bell off control 202-115, the controller controls to open a user input interface, the user may directly speak indoor and transmit it to the outdoor through the terminal device, so as to realize a talk with the outdoor people directly. Further, the second display 202 continues to display a visiting image 202-11 (FIG. 13A) so as to allow further operations on the controls 202-113, 202-114 and 202-115.

For example, when the user checks the door open control 202-113 in the first doorbell interface 202-11 or the door open control 202-123 in the second doorbell interface 202-12, in response to a selection operation for the door open controls 202-113 or 202-123, the controller opens a door by controlling the video doorbell to close an entrance control. Further, the second display 202 may display an initial image 202-0 (FIG. 10) or displays the display interface before the first doorbell interface 202-11.

For example, when the user checks the alarm control 202-114 in the first doorbell interface 202-11 or the alarm control 202-124 in the second doorbell interface 202-12, in response to a selection operation for the alarm controls 202-114 or 202-124, the controller controls the video doorbell to cause the security device to start alarm. Further, the second display 202 may display the initial image 202-0 (FIG. 10), or displays the display interface before the first doorbell interface 202-11, or display an alarm interface.

For example, when the user checks the bell off control 202-115 in the first doorbell interface 202-11, in response to a selection operation for the bell off control 202-115, the controller controls to stop the bell ringing. Further, the second display 202 continues to display the visiting image 202-11 (FIG. 13A) but the ring has been turned off, and the controls 202-113, 202-114 and 202-115 may further be operated.

In an exemplary implementation, the controller detects state of at least one terminal device 400 connected with the display apparatus 200, and generates alert information according to the state of the at least one terminal device 400.

Figure 14:
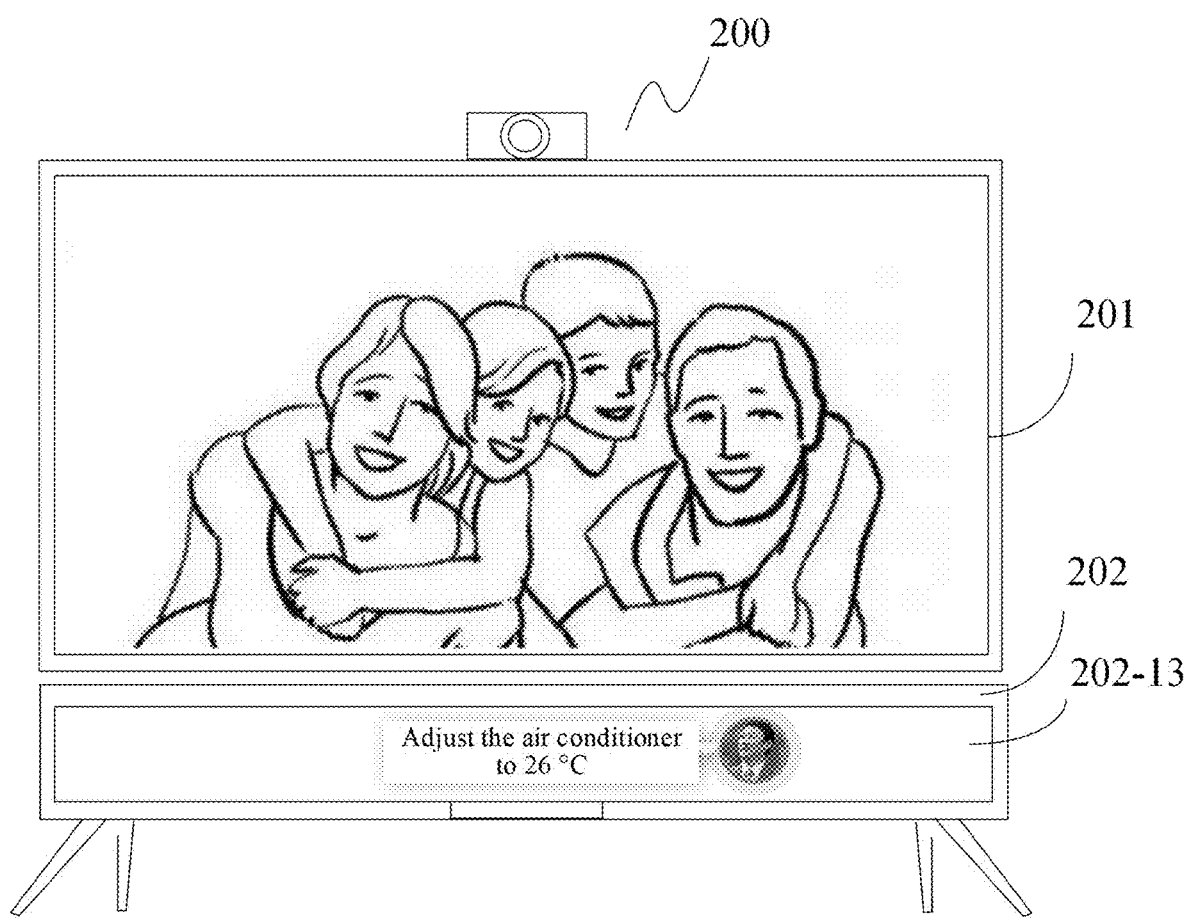
FIG. 14 illustrates a schematic diagram of a user interface in a display apparatus 200 according to an exemplary embodiment.
Figure 15:
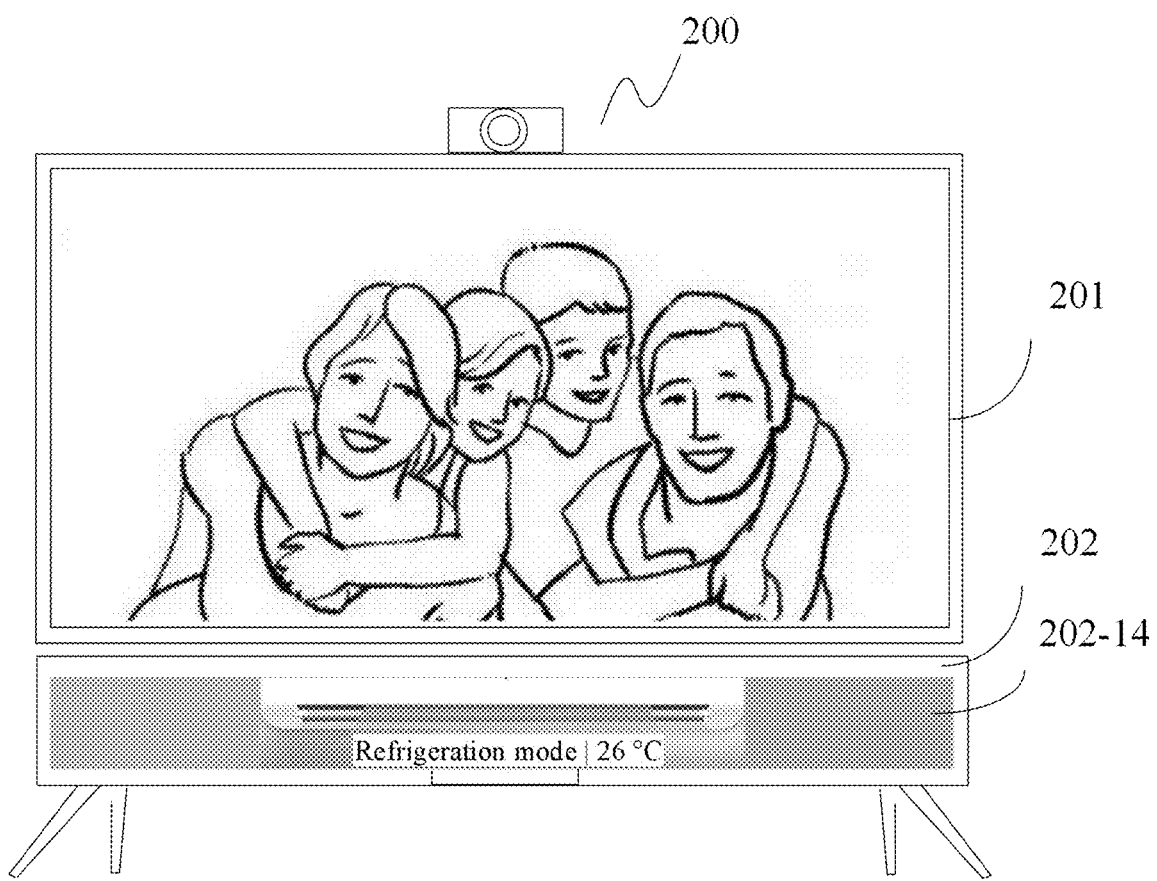
FIG. 15 illustrates a schematic diagram of a user interface in a display apparatus 200 according to an exemplary embodiment.
Figure 16:
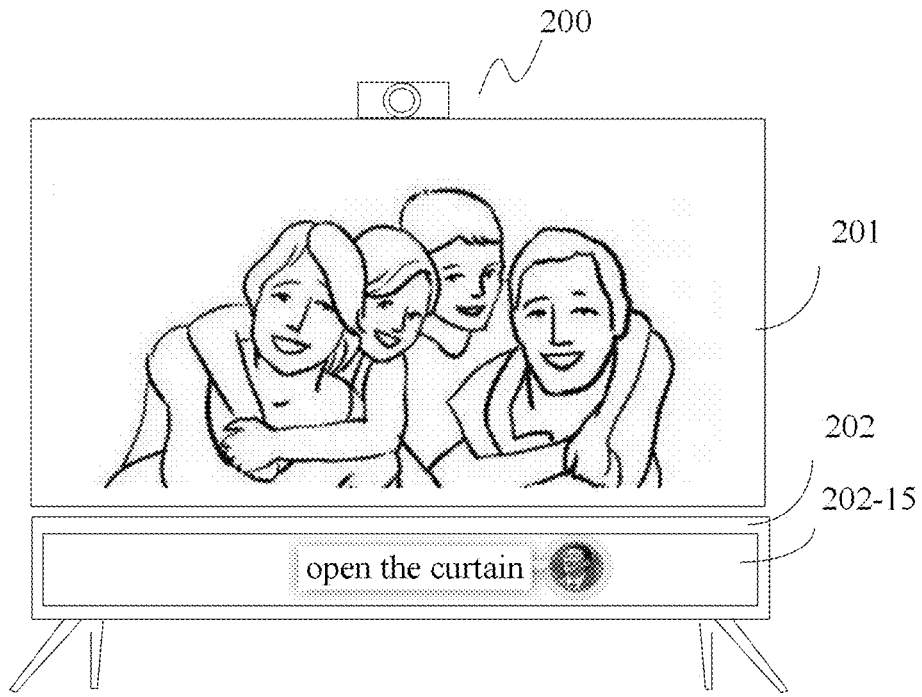
FIG. 16 illustrates a schematic diagram of a user interface in a display apparatus 200 according to an exemplary embodiment.
Figure 17:
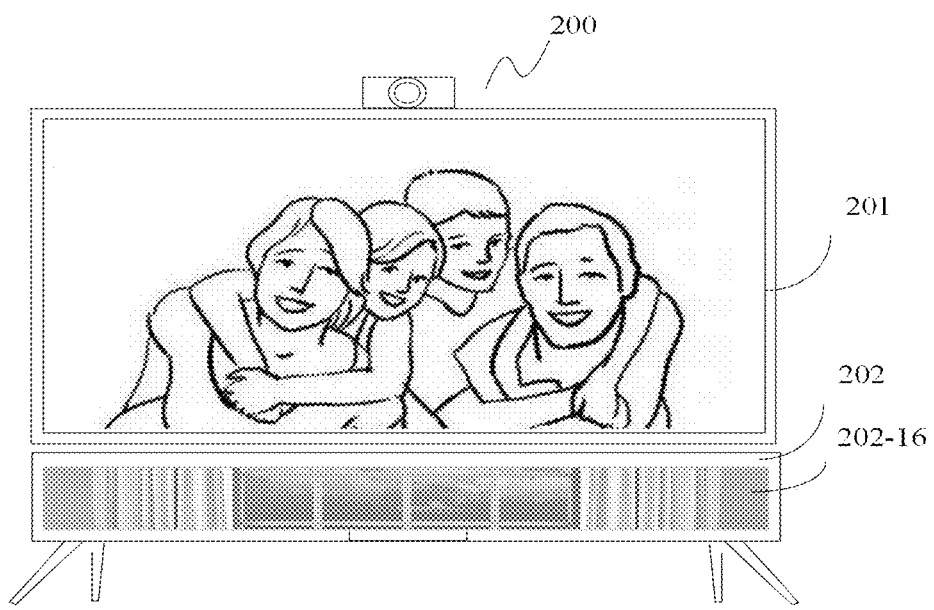
FIG. 17 illustrates a schematic diagram of a user interface in a display apparatus 200 according to an exemplary embodiment.
Figure 18:
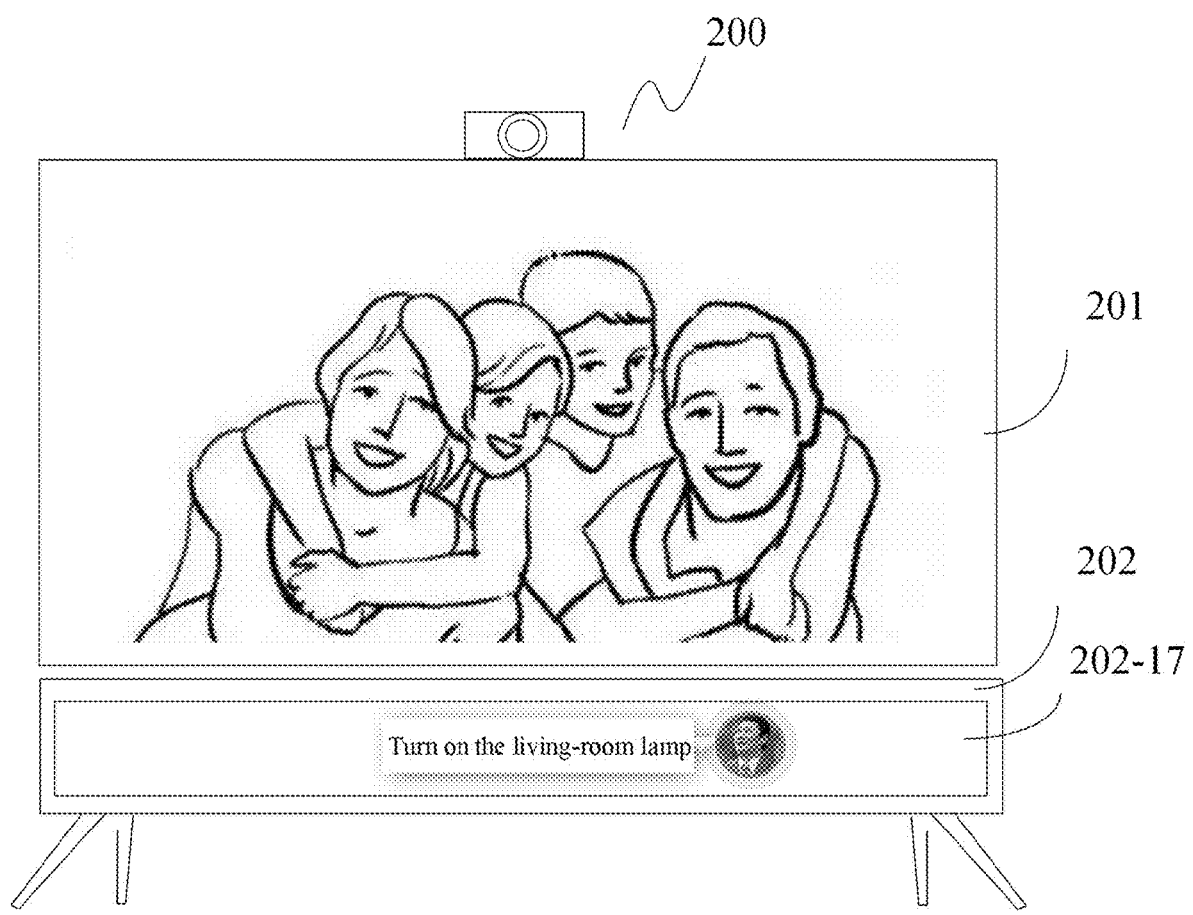
FIG. 18 illustrates a schematic diagram of a user interface in a display apparatus 200 according to an exemplary embodiment.

In an exemplary implementation, the controller receives a voice command input from a user through the user input interface 260-3, controls a corresponding terminal device according to the voice command, and displays a state image of the terminal state. Optionally, when being configured to receive a voice command (that is, a user command is input via voice) input from a user, the user input interface 260-3 may specifically be a voice receiver. For example, a user controls an air conditioner through voice, a voice command indicating adjusting the air conditioner to 26° C., and it is noted that waking of a voice interaction function of the display apparatus may further be included before receiving a voice command from a user. Optionally, a voice input result may be displayed through the second display 202 in a text form while a user inputs a voice command. As shown in FIG. 14, the "adjust an air conditioner to 26° C." and/or a portrait of the user are displayed in the first information alert interface 202-13, the controller receives the voice command and then controls the air conditioner connected with it to adjust to 26° C., and meanwhile, the second display 202 is controlled to display the second information alert interface 202-14, including a state image of the air conditioner, as shown in FIG. 15. For another example, a user controls an intelligent curtain through voice, and the voice command for indicating opening the curtain. Optionally, a voice input result may be synchronously displayed through the second display 202 in a text form, as shown in FIG. 16, "opening the curtain" is displayed in a third information alert interface 202-15, the controller receives the voice command and then controls the curtain connected with it to open, and meanwhile, the second display 202 is controlled to display the state image of the curtain, for example, a fourth information alert interface 202-16 as shown in FIG. 17. For another example, the user controls an intelligent electric lamp through voice, and the voice command for indicating turning on the lamp. Optionally, a voice input result is synchronously displayed through the second display 202 in a text form, as shown in FIG. 18, "turning on a living-room lamp" is displayed in a fifth information alert interface 202-17, the controller receives the voice command and then controls the living-room lamp connected with it to be turned on, and meanwhile, the second display 202 is controlled to display the state image of the living-room lamp, for example, a sixth information alert interface 202-18 as shown in FIG. 19.

The present disclosure provides an information alert method for the display apparatus in any of the above embodiments.

FIG. 20 illustrates a schematic diagram of an information alert method according to an exemplary embodiment. As shown in FIG. 20, the information alert method includes: S101, while a first display is playing, a second display is controlled to display an information alert interface according to acquired alert information.

When a user is watching a playing content on the first display, the alert information that needs to be displayed is displayed on the second display to avoid affecting a watching experience of the user.

For example, the controller acquires alert information through the following two manners.

In a first manner, state information of at least one terminal device connected with the display apparatus is acquired, and the alert information is generated according to the state information of the at least one terminal device. Acquiring the state information of the at least one terminal device connected with the display apparatus is real-time detection of the controller on a terminal device, or is a state actively reported by a terminal device. For example, when it is detected that a refrigerator door is not closed completely, the alert information for prompting a user to close the refrigerator door completely is generated, a washing machine sends a message of laundry done to the controller when washing is completed, a rice cooker sends a message of cooking done when cooking is completed, or the corresponding alert information is generated if a command is not clear or there is a problem in a control process.

In a second manner, a voice command input via a user is received through a user input interface, the corresponding terminal device is controlled according to the voice command, and the alert information is generated according to the state information of the terminal device. For example, according to a voice data "adjust an air conditioner to 26° C." input from a user, the controller obtains a corresponding command by recognizing the voice data, controls the terminal device according to the command, and generates alert information according to a control result.

Figure 21B:
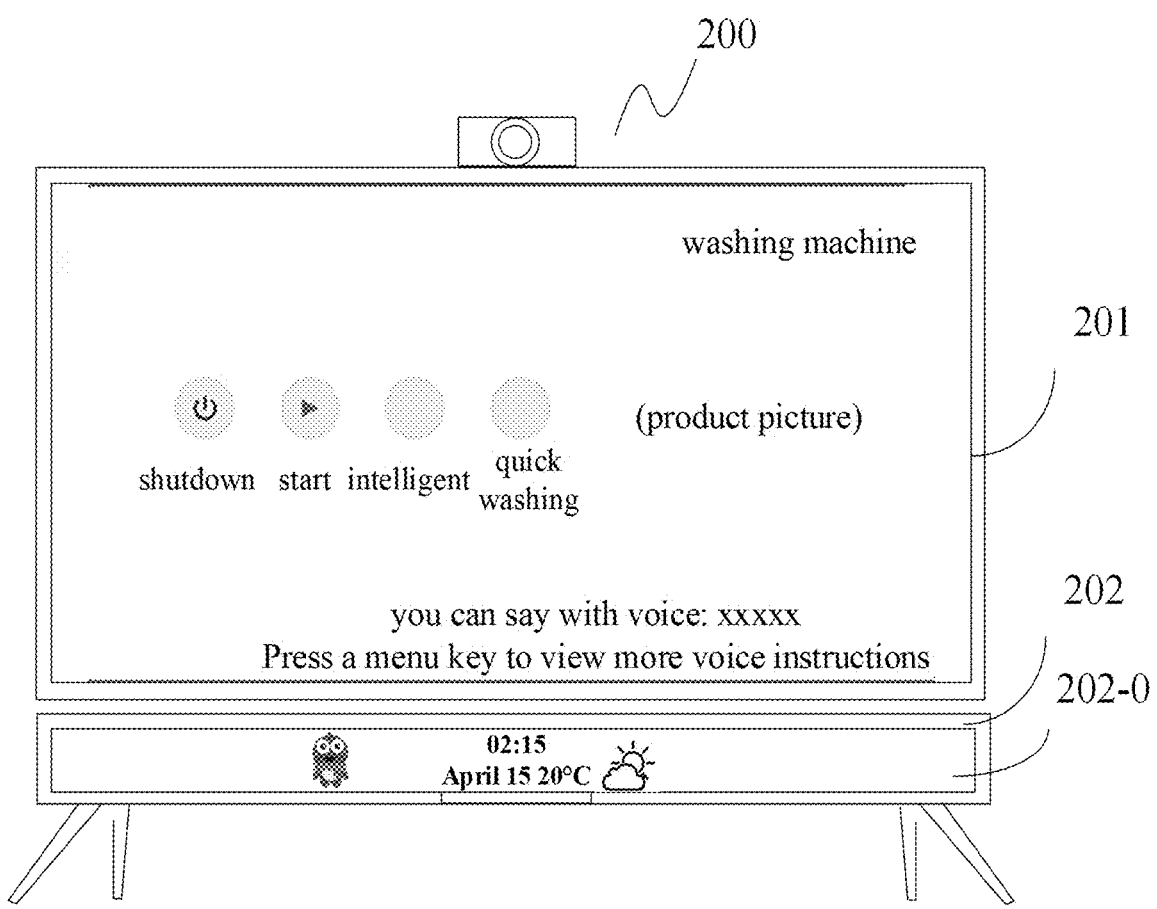
FIG. 21B illustrates a schematic diagram of an information alert interface according to an exemplary embodiment.

Further, the second controller is controlled to display an information alert interface, and the alert information displayed on the information alert interface is configured to indicate the state of the at least one terminal device connected with the display apparatus. FIG. 21A and FIG. 21B, illustrate a schematic diagram of an information alert interface according to an exemplary embodiment. As an example, with reference to FIG. 21A, when it is detected that the washing machine completes a task, the information alert interface includes the alert information 01 "the washing machine has completed washing, clothes is ready for drying", and optionally, the information alert interface may further include a cartoon image 02, a washing machine graphic 03 and the like. As another example, when a corresponding terminal device is controlled according to a voice command input from a user, a control purpose or a control result as shown in FIG. 15, FIG. 17 or FIG. 19 is displayed.

According to the information alert method in the embodiments of the present disclosure, when the first display performs playing, the second display is controlled to display an information alert interface according to acquired alert information, and the alert information displayed on the information alert interface is configured to indicate state of at least one terminal device connected with the display apparatus. According to the present disclosure, the alert information to be displayed is displayed through a second display, so that when a user watches a television, states of other terminal devices can be acquired conveniently without affecting the content being watched, thereby improving user's experience, and improving interactive effects.

In a specific implementation, after the second display is controlled to display an information alert interface, if the alert information cannot display the entire content, or when it needs to implement further controlling on the terminal device according to a prompt of the alert information, the present disclosure may open the details interface of the alert information for viewing so as to implement further control. For example, the present disclosure includes: in response to a first operation on an alert information control in the information alert interface, the first display is controlled to display a details interface of the alert information in a floating window mode, the second display is controlled to return to an interface before displaying the alert information, or the second display is controlled to return an initial interface, wherein the first operation is a selection operation for an alert information control received through a selector, and the first operation may be that a user moves a focus via a control device to check the alert information or check a details control 04 in the information alert interface. It should be understood that a page link of the details control 04 may be set on the alert information, or the first operation is realized by pressing a key (for example, "pressing a menu key to view details" in the information alert interface as shown in FIG. 21A) corresponding to the control device according to the alert in the information alert interface.

Further, after viewing details comes into effect, with reference to FIG. 21B, the first display 201 correspondingly displays a skipped and linked details information page of washing machine. Further, the second display 202 may display an initial image 202-0 (FIG. 10). Optionally, the details information page of washing machine includes a close control, a start control, an intelligent washing control and a quick washing control, and may further include a product image of the washing machine, or a prompt word for prompting a user to perform voice control, for example, telling a user that "you can say with voice: xxxxx presses the menu key to view more voice commands".

In a specific implementation, after the first display displays the details interface of the alert information, the present disclosure further includes: receiving a command for closing the alert information via the user input interface, and in response to the command, controlling the first display to close the details interface. For example, the controller may receive a command for closing the alert information sent from a user by pressing a button (e.g. a back key) on the control device, or may receive a command from a user via voice, or may receive a touch on the alert information closing control on the details interface received from a user, or may move a focus to the alert information closing control on the details interface via the control device.

In a specific implementation, after the first display displays the details interface of the alert information, the present disclosure further includes: in response to a second operation on a device manipulation control in the details interface of the alert information, controlling a corresponding terminal device to perform a corresponding operation, and the second operation is a selection operation for the device manipulation control received via a selector. For example, the alert information indicates that "current indoor brightness is low, whether to turn on a living-room lamp", then a user checks a living-room lamp turning-on control on the details interface of the alert information, and the living-room lamp is controlled to be turned on.

In a specific scenario, when an intelligent doorbell is triggered, with reference to FIG. 13, the information alert interface includes a first doorbell interface. The first doorbell interface includes a video image and a doorbell call answer control. The controller controls the second display to display a second doorbell interface in response to a third operation on the doorbell call answer control in the first doorbell interface. The second doorbell interface includes a video image, the third operation is a selection operation for the doorbell call answer control via the selector, and meanwhile, a voice call function is started so that the user may have video call with a visitor.

As an example, the second doorbell interface further includes a doorbell call end control. At the end of the call, in response to receiving a selection operation for the doorbell call end control, the call is ended and video is turned off so that the second display displays an interface displayed before the first doorbell interface, or an initial interface.

As an example, the first doorbell interface and the second doorbell interface both include a door open control. By receiving a selection operation for the door open control in the first doorbell interface or the second doorbell interface, an entrance control is closed before calling or after calling so as to allow the visitor to enter. Similarly, the first doorbell interface and the second doorbell interface both include a alarm control. By receiving a selection operation for the alarm control in the first doorbell interface or the second doorbell interface, alarm is performed before calling or after calling so as to cause the security personnel notice the visitor.

As an example, the first doorbell interface may further include a bell off control. In response to receiving a selection for the bell off control in the first doorbell interface, the doorbell ringing is turned off.

Figure 22:
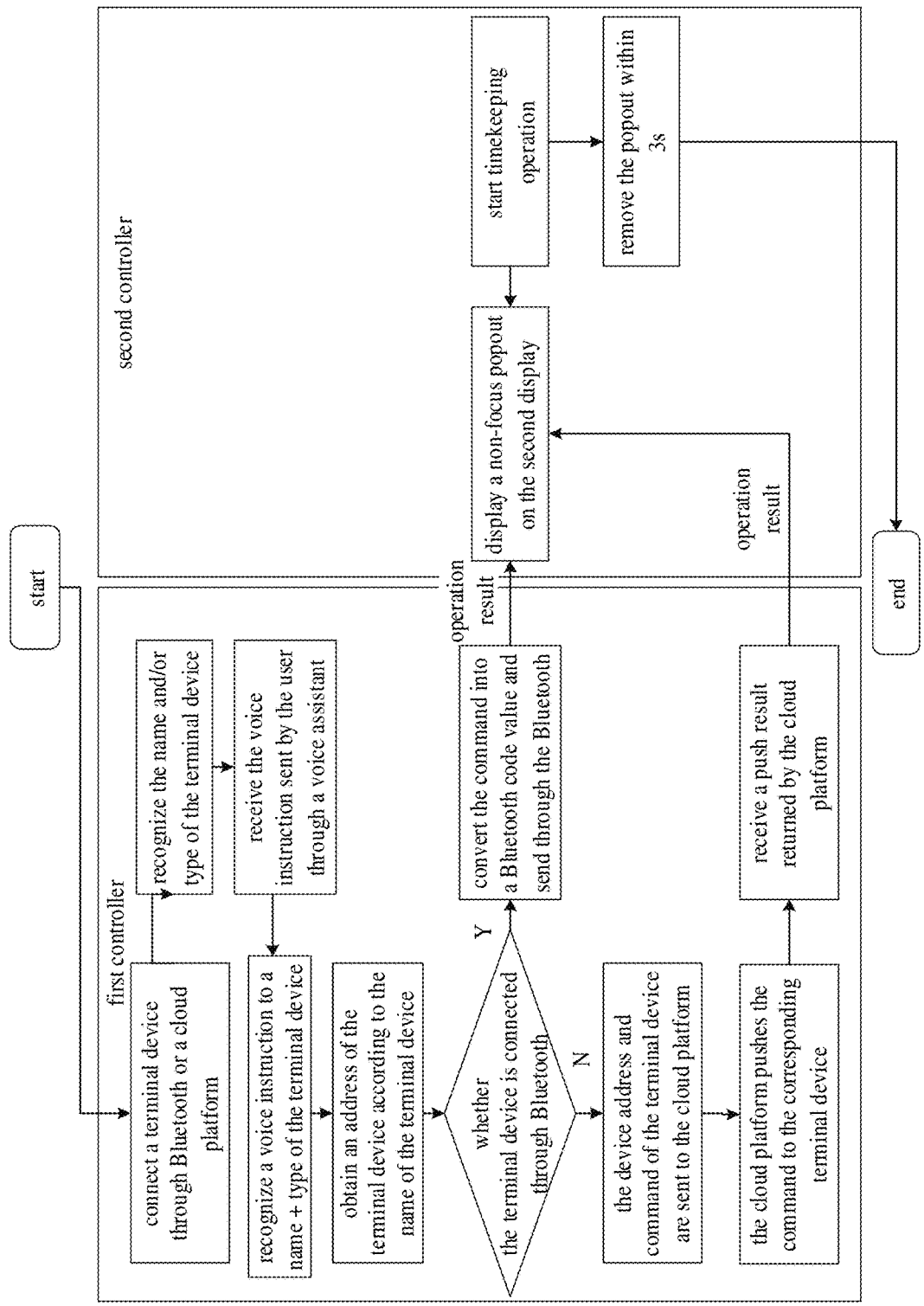
FIG. 22 illustrates a schematic diagram of a control flow of a terminal device according to an exemplary embodiment.
Figure 23:
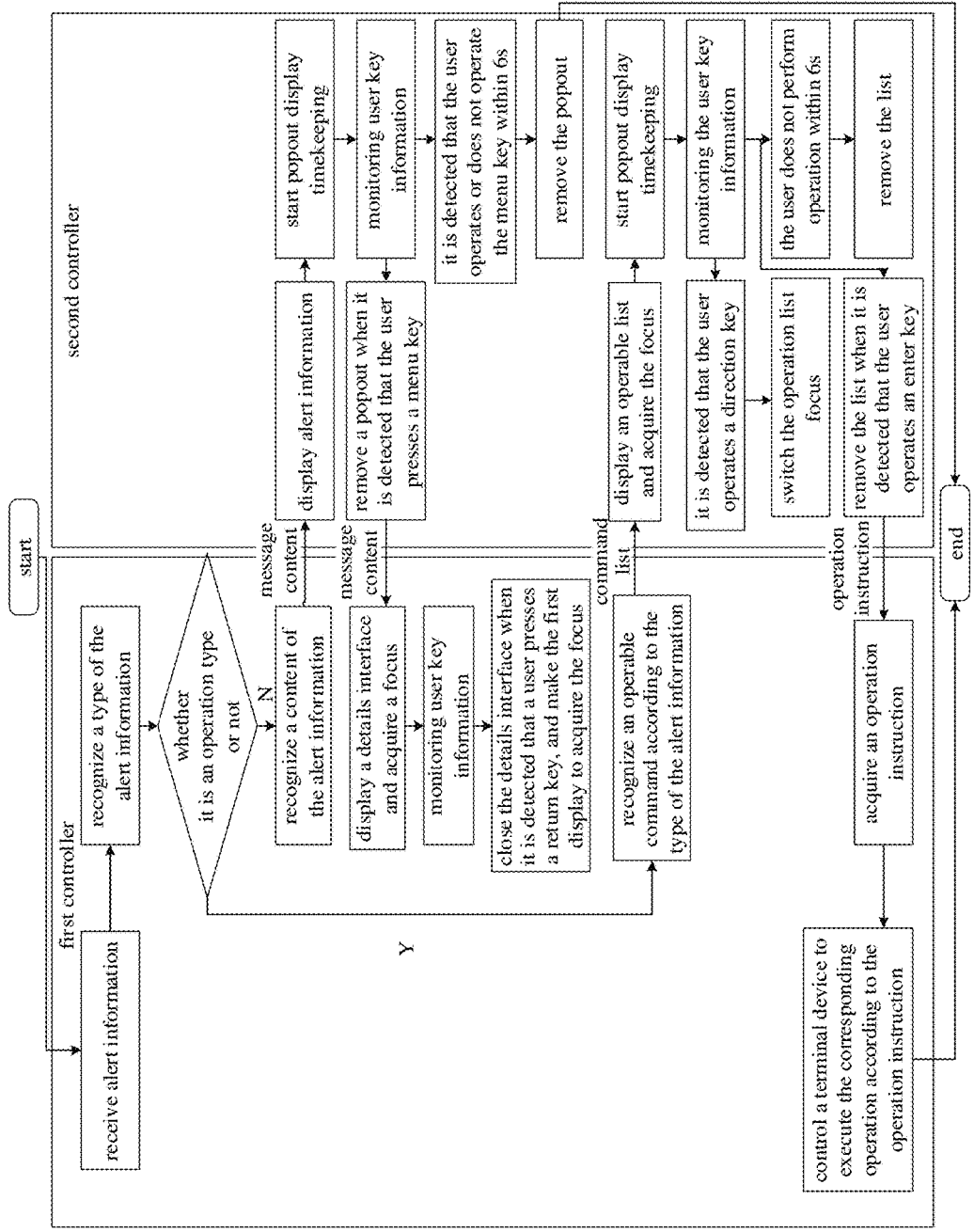
FIG. 23 illustrates a schematic diagram of a processing flow of an information alert method according to an exemplary embodiment.

FIG. 22 illustrates a schematic diagram of a control flow of the terminal device according to an exemplary embodiment. FIG. 23 illustrates a schematic diagram of a processing flow of the information alert method according to an exemplary embodiment. As shown in FIG. 22 and FIG. 23, the information alert method includes the following operations.

(1) The terminal devices connected to the display apparatus are mainly interconnected through Bluetooth® or connected with a cloud platform through WiFi.

(2) After connection, basic information of the terminal device is read to recognize the name and/or type of the terminal device, such as a washing machine, and a refrigerator.

(3) When a user issues a voice command associated with a terminal device, a voice assistant recognizes the voice command as a name+command form for the terminal device, according to a match with a current terminal device connected with the display apparatus through a cloud platform or Bluetooth®, and a target device address controlled by the user is recognized.

(4) If the terminal device is connected through Bluetooth®, the command IS transcoded into a Bluetooth® code value for transmitting to a corresponding terminal device, and a control result is output or broadcasted through the second display. At the moment, the second display does not acquire a focus and only present alerts without interrupting playing of the first display.

(5) If the terminal device is connected via the cloud platform, the device address and command of the terminal device are sent to the cloud platform through wifi, and the cloud platform pushes the command to the corresponding terminal device. After the first display receives a control result of the cloud platform, the second display is notified to display the control result. In this scenario, the second display does not acquire a focus and only presents alerts without interrupting playing of the first display.

(6) When the first display receives notification information sent from the terminal device via the cloud platform or Bluetooth®, the information is parsed to acquire a detailed content of a notification so as to obtain alert information, mainly including a device name, reminder information, an information type, and the like, and a message is sent to the second display through a serial port so as to display the alert information.

(7) If the message displayed on the second display is a common type, the alert information is displayed, acquiring a focus and monitoring system keys. If a user presses a menu key, the first display is notified to display details, the second display is controlled to close the alert information. If the user does not perform operation within 6 s or clicks other keys, the second display is controlled to close the alert information.

(8) If the alert information displayed on the second display is an operation type, meaning that the alert information requires user's further operation, all buttons available for operations are displayed, and system keys are being monitored. If a user presses a direction key, the focus is switched among the buttons available for operations. If the user presses a confirmation button, the instruction corresponding to the button is acquired and sent to the first controller. The first controller recognizes the type of the instruction and finds a corresponding terminal device, the instruction is sent to the corresponding terminal device via the Bluetooth® or cloud platform, and meanwhile, the second display is controlled to close the alert information. If the user does not perform operation within 6 s or clicks the back button, the second display is only controlled to close the alert information without causing the first display to display the details, wherein the alert information may be displayed in a pop-up box.

Figure 24:
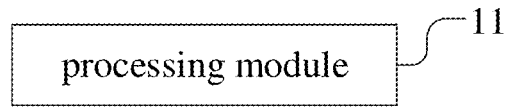
FIG. 24 illustrates an apparatus for information alert according to an exemplary embodiment.

Accordingly, in an apparatus side, FIG. 24 illustrates an information alert apparatus according to an exemplary embodiment, including: a processing module 11, configured to control, according to acquired alert information, a second display to display an information alert interface while a first display performs playing, where the alert information displayed on the information alert interface is for indicating a state of at least one terminal device connected with the display apparatus.

The information alerting apparatus according to the embodiments of the present disclosure includes a processing module 11, configured to control, according to acquired alert information, the second display to display an information alert interface while the first display performs playing, wherein the alert information displayed on the information alert interface is for indicating the state of at least one terminal device connected with the display apparatus. The present disclosure displays the alert information to be displayed through the second display, so that when a user watches a television, states of other terminal devices can be acquired conveniently without affecting contents being watched, thereby improving user's experience, and interactive effect.

In an implementation, the processing module is further configured to, in response to a first operation on an alert information open control in the information alert interface, control the first display to display a details interface of the alert information in a floating window mode, and control the second display to return to an interface before displaying the alert information, wherein the first operation is a selection operation for the alert information open control, received through a selector.

Figure 25:
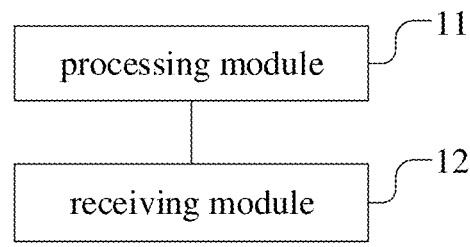
FIG. 25 illustrates an apparatus for information alert according to an exemplary embodiment.

FIG. 25 illustrates an information alert apparatus according to an exemplary embodiment. As shown in FIG. 25, the apparatus further includes: a receiving module 12, configured to receive a command for closing the alert information; and the processing module 11 is further configured to control the first display to close the details interface in response to the command.

In an embodiment, in response to a second operation on a device manipulation control in the details interface of the alert information, a corresponding terminal device is controlled to perform a corresponding operation, wherein the second operation is a selection operation for the device manipulation control received through the selector.

In an embodiment, the information alert interface includes a first doorbell interface, the first doorbell interface includes a video image and a doorbell call answer control, and then the processing module is further configured to: in response to a third operation on the doorbell call answer control in the first doorbell interface, control the second display to display a second doorbell interface, wherein the second doorbell interface includes a video image, and the third operation is a selection operation for the doorbell call answer control via a selector.

Figure 26:
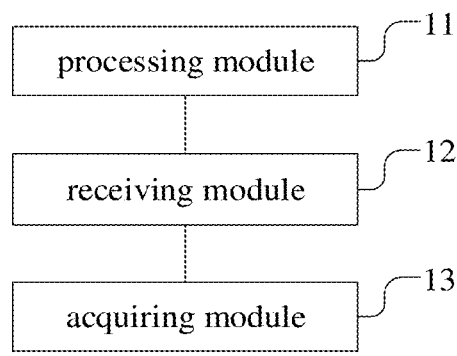
FIG. 26 illustrates an apparatus for information alert according to an exemplary embodiment.

FIG. 26 illustrates an information alert apparatus according to an exemplary embodiment. As shown in FIG. 26, the apparatus further includes: an acquiring module 13, configured to acquire state information of at least one terminal device connected with the display apparatus; and the processing module 11 is further configured to generate alert information according to the state information of at least one terminal device.

In an embodiment, the receiving module 12 is further configured to receive a voice command, input from a user, through a user input interface; the processing module 11 is further configured to control the corresponding terminal device according to the voice instruction; and the processing module 11 is further configured to generate the alert information according to the state of the terminal device.

Figure 27:
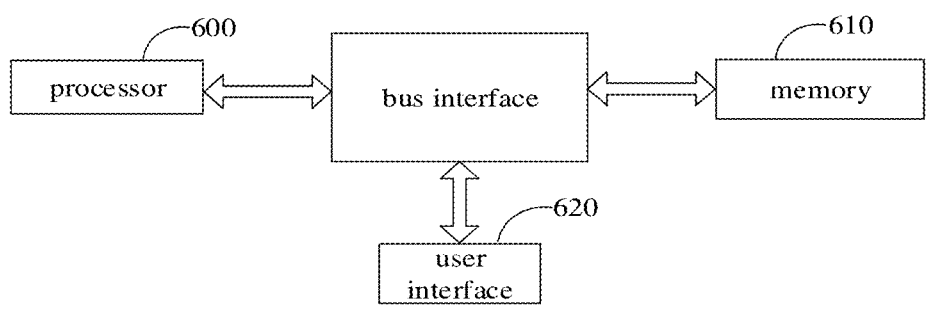
FIG. 27 illustrates an apparatus for information alert according to an exemplary embodiment.

FIG. 27 illustrates an information alert apparatus according to the exemplary embodiment, including: a processor 600, configured to execute one or more computer instructions in a memory 610 to cause the processor to perform the information alert method in the above embodiments.

In FIG. 27, a bus architecture may include any number of interconnected buses and bridges, which are specifically linked together by one or more processors indicated by the processor 600 and various circuits of a memory indicated by a memory 610. The bus architecture may further link various other circuits such as a peripheral device, a voltage stabilizer and a power management circuit together, which is well known in the field and therefore is not further described herein. A bus interface provides an interface.

An exemplary implementation of the present disclosure provides a display terminal. The display terminal may specifically be a desktop computer, a portable computer, a smart phone, a tablet computer, a personal digital assistant (PDA) and the like. The display terminal may include a center processing unit (CPU), a memory, an input/output device, and the like. The input device may include a keyboard, a mouse, a touch screen and the like. The output device may include a display apparatus, such as a liquid crystal display (LCD), a cathode ray tube (CRT) and the like.

As for different display terminals, in some exemplary implementations, user interfaces 620 and 820 may be interfaces for connecting with a required external or internal device. Connected devices include but not limited to a keypad, a display, a speaker, a microphone, a joystick and the like.

The processor is configured for managing bus architecture and performing general processing, and the memory may store data used by the processor 600 during operation.

In some exemplary implementations, the processor may be the center processing unit (CPU), an application specific integrated circuit (ASIC), a field-programmable gate array (FPGA), or a complex programmable logic device (CPLD).

The memory may include a read only memory (ROM) and a random access memory (RAM), and provides instructions and data stored in the memory for the processor. In the embodiments of the present disclosure, the memory may be configured to store programs of any method in the exemplary implementations of the present disclosure.

The processor invokes the instructions stored in the memory, and is configured to execute any method in the exemplary implementations of the present disclosure according to the instructions.

An exemplary implementation of the present disclosure provides a computer storage medium, configured to store instructions used by the apparatus in the above embodiments of the present disclosure, and the instructions are configured to execute any above method in the embodiments of the present disclosure.

The computer storage medium may be any available medium or data storage device which can be accessed by the computer, including but not limited to a magnetic memory (for example, a floppy disk, a hard disk, a magnetic tape, a magnetic optical (MO) and the like), an optical memory (for example, CD, DVD, BD, HVD and the like), and a semiconductor memory (for example, an ROM, an EPROM, an EEPROM, a nonvolatile memory (NAND FLASH), a solid state disk (SSD)) and the like.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display apparatus, comprising:
a first display configured to play an image or an interface;
a first panel configured to present an image of the first display;
a first backlight component located below the first panel, configured to provide backlight for the first panel, and comprising a first backplate;
a motherboard, an interactive board, a first display driver board and a power board, which are disposed on the first backplate, wherein the first display driver board is configured to perform thousands backlight partition control through a pulse width modulation (PWM) signal and a Local dimming signal transmitted from a first controller on the motherboard, and the thousands backlight partition control is changed according to content of the image;
a base, configured to support the display apparatus;
a first rear shell configured to house the first panel to hide the first backlight component, the motherboard, the interactive board, the first display driver board and the power board;
a second display configured to play an image or an interface;
a second panel configured to present an image of the second display;
a second backlight component located below the second panel, configured to provide backlight for the second panel, and comprising a second backplate;
a second display driver board disposed on the second backplate;
a second rear shell configured to house the second panel to hide the second backlight component, a conversion driver board, a second TCON board and a key board; and a controller, in connection with the first display and the second display and configured to:
while the first display is playing an image, control the second display to display an information alert interface according to acquired alert information, wherein the alert information displayed on the information alert interface is configured for indicating a state of at least one terminal device connected with the display apparatus;
wherein the display apparatus further comprises a selector, wherein
the controller is further configured to:
after controlling the second display to display the information alert interface, in response to a first operation on an alert information control in the information alert interface, control the first display to display a details interface of the alert information in a floating window mode, and control the second display to return to an interface before displaying the alert information, wherein the first operation is a selection operation for the alert information control received through the selector.

2. The display apparatus according to claim 1, further comprising a user input interface, wherein the controller is further configured to:
receive a command for closing the alert information through the user input interface; and
control the first display to close the details interface in response to the command.

3. The display apparatus according to claim 2, wherein the controller is further configured to:
in response to a second operation on a device manipulation control in the details interface of the alert information, control a corresponding terminal device associated with the device manipulation control to perform an operation, wherein the second operation is a selection operation for the device manipulation control received through the selector.

4. The display apparatus according to claim 1, wherein the information alert interface comprises a first doorbell interface, and the first doorbell interface comprises a video image and a doorbell call answer control; and
the controller is further configured to:
control the second display to display a second doorbell interface in response to a third operation on the doorbell call answer control in the first doorbell interface, wherein the second doorbell interface comprises a video image different from the video image in the first doorbell interface, and the third operation is a selection operation for the doorbell call answer control received through the selector.

5. The display apparatus according to claim 1, wherein the controller is further configured to:
obtain state information of the at least one terminal device connected with the display apparatus; and
generate the alert information according to the state information of the at least one terminal device.

6. The display apparatus according to claim 1, wherein the controller is further configured to:
receive a voice command input from a user through a user input interface;
control a terminal device in response to the voice command; and
generate alert information according to a state of the terminal device after implementing control of the terminal device in response to the voice command.

7. The display apparatus according to claim 6, wherein the controller IS further configured to:
  determine whether the terminal device is connected with the display apparatus via Bluetooth®;
  in response to the terminal device being connected with the display apparatus via Bluetooth®, transcode the voice command into a Bluetooth® code value and send the Bluetooth® code value to the terminal device; and
  control the second display not to acquire a focus and to present the alert information associated with state information of the terminal device after implementing control of the terminal device in response to the voice command without interrupting image playing on the first display.

8. The display apparatus according to claim 6, wherein the controller is further configured to:
  determining whether the alert information displayed on the second display requires a user's further operation;
  in response to the alert information requiring the user's further operation, monitor a key event; and
  upon a key event being monitored, send an instruction associated with the key event to the terminal device and control the second display to close the alert information.

9. The display apparatus according to claim 8, wherein the controller is further configured to:
  in response to no key event being monitored within a predefined time period, control the second display to close the alert information.

10. A method for information alert in a display apparatus, comprising:
  while a first display of the display apparatus is playing an image, controlling a second display to display an information alert interface according to acquired alert information, wherein the display apparatus comprises the first display configured to play an image or an interface, a first panel configured to present an image of the first display, a first backlight component located below the first panel, configured to provide backlight for the first panel and comprising a first backplate, a motherboard, an interactive board, a first display driver board and a power board which are disposed on the first backplate, wherein the first display driver board is configured to perform thousands backlight partition control through a pulse width modulation (PWM) signal and a Local dimming signal transmitted from a first controller on the motherboard, and the thousands backlight partition control is changed according to content of the image; a base, configured to support the display apparatus; a first rear shell configured to house the first panel to hide the first backlight component, the motherboard, the interactive board, the first display driver board and the power board, the second display configured to play an image or an interface, a second panel configured to present an image of the second display, a second backlight component located below the second panel, configured to provide backlight for the second panel and comprising a second backplate, a second display driver board disposed on the second backplate, and a second rear shell configured to house the second panel to hide the second backlight component, a conversion driver board, a second TCON board and a key board, wherein the alert information displayed on the information alert interface is configured for indicating a state of at least one terminal device connected with the display apparatus;
  wherein the method further comprising:
  after controlling the second display to display the information alert interface, in response to a first operation on an alert information control in the information alert interface, controlling the first display to display a details interface of the alert information in a floating window mode; and
  controlling the second display to return to an interface before displaying the alert information, wherein the first operation is a selection operation for the alert information control received through a selector.

11. The method according to claim 10, further comprising:
  receiving a command for closing the alert information through a user input interface; and
  controlling the first display to close the details interface in response to the command.

12. The method according to claim 11, further comprising:
  in response to a second operation on a device manipulation control in the details interface of the alert information, controlling a corresponding terminal device associated with the device manipulation control to perform an operation, wherein the second operation is a selection operation for the device manipulation control received through the selector.

13. The method according to claim 10, wherein the information alert interface comprises a first doorbell interface, and the first doorbell interface comprises a video image and a doorbell call answer control; and the method further comprises:
  controlling the second display to display a second doorbell interface in response to a third operation on the doorbell call answer control in the first doorbell interface, wherein the second doorbell interface comprises a video image different from the video image in the first doorbell interface, and the third operation is a selection operation for the doorbell call answer control received through a selector.

14. The method according to claim 10, further comprising:
  obtaining state information of the at least one terminal device connected with the display apparatus; and
  generating the alert information according to the state information of the at least one terminal device.

15. The method according to claim 10, further comprising:
  receiving a voice command input from a user through a user input interface;
  controlling a terminal device in response to the voice command; and
  generating alert information according to a state of the terminal device after implementing control of the terminal device in response to the voice command.

16. The method according to claim 15, further comprising:
  determining whether the terminal device is connected with the display apparatus via Bluetooth®;
  in response to the terminal device being connected with the display apparatus via Bluetooth®, transcoding the voice command into a Bluetooth® code value and sending the Bluetooth® code value to the terminal device; and
  controlling the second display not to acquire a focus and to present the alert information associated with state information of the terminal device after implementing control of the terminal device in response to the voice command without interrupting image playing on the first display.

17. The method according to claim 15, further comprising:
   determining whether the alert information displayed on the second display requires a user's further operation;
   in response to the alert information requiring the user's further operation, monitoring a key event; and
   upon a key event being monitored, sending an instruction associated with the key event to the terminal device and controlling the second display to close the alert information.

18. The method according to claim 17, further comprising:
   in response to no key event being monitored within a predefined time period, controlling the second display to close the alert information.

\* \* \* \* \*